(12) United States Patent
Ookubo et al.

(10) Patent No.: US 9,354,378 B2
(45) Date of Patent: May 31, 2016

(54) ILLUMINATING DEVICE AND DISPLAY

(71) Applicant: Toppan Printing Co., Ltd., Taito-ku (JP)

(72) Inventors: Yu Ookubo, Taito-ku (JP); Tomohiro Nakagome, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 118 days.

(21) Appl. No.: 14/458,765

(22) Filed: Aug. 13, 2014

(65) Prior Publication Data

US 2015/0036313 A1 Feb. 5, 2015

Related U.S. Application Data

(63) Continuation of application No. PCT/JP2013/052496, filed on Feb. 4, 2013.

(30) Foreign Application Priority Data

Feb. 14, 2012 (JP) .................................. 2012-029317
Oct. 10, 2012 (JP) .................................. 2012-224893

(51) Int. Cl.
*F21V 8/00* (2006.01)

(52) U.S. Cl.
CPC ............ *G02B 6/0043* (2013.01); *G02B 6/0061* (2013.01); *G02B 6/0036* (2013.01); *G02B 6/0038* (2013.01); *G02B 6/0051* (2013.01); *G02B 6/0053* (2013.01)

(58) Field of Classification Search
CPC .. G02B 6/0036; G02B 6/0038; G02B 6/0043; G02B 6/0051; G02B 6/0053; G02B 6/0061
See application file for complete search history.

(56) References Cited

U.S. PATENT DOCUMENTS

| | | | | |
|---|---|---|---|---|
| 7,431,489 B2* | 10/2008 | Yeo | ...................... | G02B 5/0242 362/606 |
| 7,991,257 B1* | 8/2011 | Coleman | ............ | B29D 11/0073 264/1.24 |
| 8,430,548 B1* | 4/2013 | Kelly | ................... | G02B 5/0242 362/606 |
| 2013/0286661 A1* | 10/2013 | Holman | ............. | G02B 26/0875 362/332 |

FOREIGN PATENT DOCUMENTS

| | | |
|---|---|---|
| JP | 60-075907 U | 5/1985 |
| JP | 01-241590 | 9/1989 |

(Continued)

OTHER PUBLICATIONS

International Search Report issued Apr. 23, 2013, in International Application PCT/JP2013/052496.

*Primary Examiner* — Thomas M Sember

(74) *Attorney, Agent, or Firm* — Oblon, McClelland, Maier & Neustadt, L.L.P.

(57) ABSTRACT

An illuminating device includes a light source which outputs light, a light guide member having an incident surface on which the light from the light source is incident, an output surface through which the light is output from the light guide member, and a light deflection surface on which light deflection elements are formed such that the light is guided toward the output surface, and an isotropic light diffusion member positioned over the output surface of the light guide member. The light guide member has the incident surface extended in an X direction and includes a unit lens formed on the output surface and extended in a Y direction orthogonal to the X direction. A light-deflection element density D representing a number of the light deflection elements per unit area increases as the light deflection elements are positioned farther away from the incident surface.

20 Claims, 22 Drawing Sheets

(56) References Cited

FOREIGN PATENT DOCUMENTS

| JP | 2000-089033 | 3/2000 |
|----|-------------|--------|
| JP | 2003-208810 | 7/2003 |
| JP | 2003-270447 | 9/2003 |
| JP | 2004-006326 | 1/2004 |
| JP | 2004-295080 | 10/2004 |
| JP | 2006-155994 | 6/2006 |
| JP | 2006-196384 | 7/2006 |

* cited by examiner

ILLUMINATING DEVICE AND DISPLAY

CROSS-REFERENCE TO RELATED APPLICATIONS

The present application is a continuation of International Application No. PCT/JP2013/052496, filed Feb. 4, 2013, which is based upon and claims the benefits of priority to Japanese Application No. 2012-029317, filed Feb. 14, 2012 and Japanese Application No. 2012-224893, filed Oct. 10, 2012. The entire contents of all of the above applications are incorporated herein by reference.

TECHNICAL FIELD

The present invention relates to illuminating devices equipped with light guide members used for controlling illumination light paths, and displays equipped with these illuminating devices.

BACKGROUND ART

Japanese Patent Laid-Open No. H01-241590 describes an illuminating device including a light guide member having a light deflection surface on which printed dots of white ink are formed as light deflection elements.

SUMMARY OF INVENTION

According to one aspect of the present invention, an illuminating device includes a light source which outputs light, a light guide member having an incident surface on which the light from the light source is incident, an output surface through which the light is output from the light guide member, and a light deflection surface on which light deflection elements are formed such that the light is guided toward the output surface, and an isotropic light diffusion member positioned over the output surface of the light guide member. The light guide member has the incident surface extended in an X direction and includes a unit lens formed on the output surface and extended in a Y direction orthogonal to the X direction. The light deflection elements are positioned such that a light-deflection element density D representing a number of the light deflection elements per unit area increases as the light deflection elements are positioned farther away from the incident surface. The light deflection elements are formed in a pattern which is divided into plural regions in the Y direction and are positioned in one of the regions such that a pitch $L_x$ in the X direction is substantially constant, and that adjacent light deflection elements in the Y direction are shifted from each other in the X direction by a half of the pitch $L_x$ and have a pitch $L_y$ in the Y direction which becomes shorter as the light deflection elements are positioned farther away from the incident surface, $G_x$, $G_y$, $\beta$, $\gamma$, and $\theta$ are defined by following formulae (1), and $L_x$ and $L_y$ satisfy following formulae (2) in one of the regions which is adjacent to the incident surface:

$$G_x = H_L \tan(\theta - \beta) + \frac{a_x}{2}$$
$$G_y = H_L \tan\gamma + \frac{a_y}{2}$$
$$\beta = \sin^{-1}\left(\frac{\sin(\theta - \alpha)}{N_L}\right)$$
$$\gamma = \sin^{-1}\left(\frac{\sin\alpha}{N_L}\right)$$
$$\theta = \tan^{-1}\left[\frac{10}{P}\int_0^{1/10 P}\left|\frac{df(t)}{dt}\right|dt\right]$$
(1)

$$2a_x \le L_x \le 4G_x$$
$$2a_y \le L_y \le 4G_y$$
$$\frac{2S_d}{L_x L_y} \ge 0.01$$
(2)

where $H_L$ represents a thickness of the light guide member,
$N_L$ represents a refractive index of the light guide member,
$S_d$ represents an area of one of the light deflection elements when viewed from a side of the light deflection surface,
t represents a measured displacement in the X direction when an end of the unit lens is set to 0,
f(t) represents a distance between an edge of the unit lens and the output surface of the light guide member when the unit lens is taken along a plane orthogonal to the output surface and parallel to the X direction,
P represents a pitch of the unit lens,
$\alpha$ represents an angle at which an intensity of an output light generated by a collimate light incident orthogonally to the isotropic light diffusion member becomes one tenth of a maximum intensity thereof in an angular distribution of the output light,
$a_x$ represents a width of each of the light deflection elements in the X direction, and
$a_y$ represents a width of each of the light deflection elements in the Y direction.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
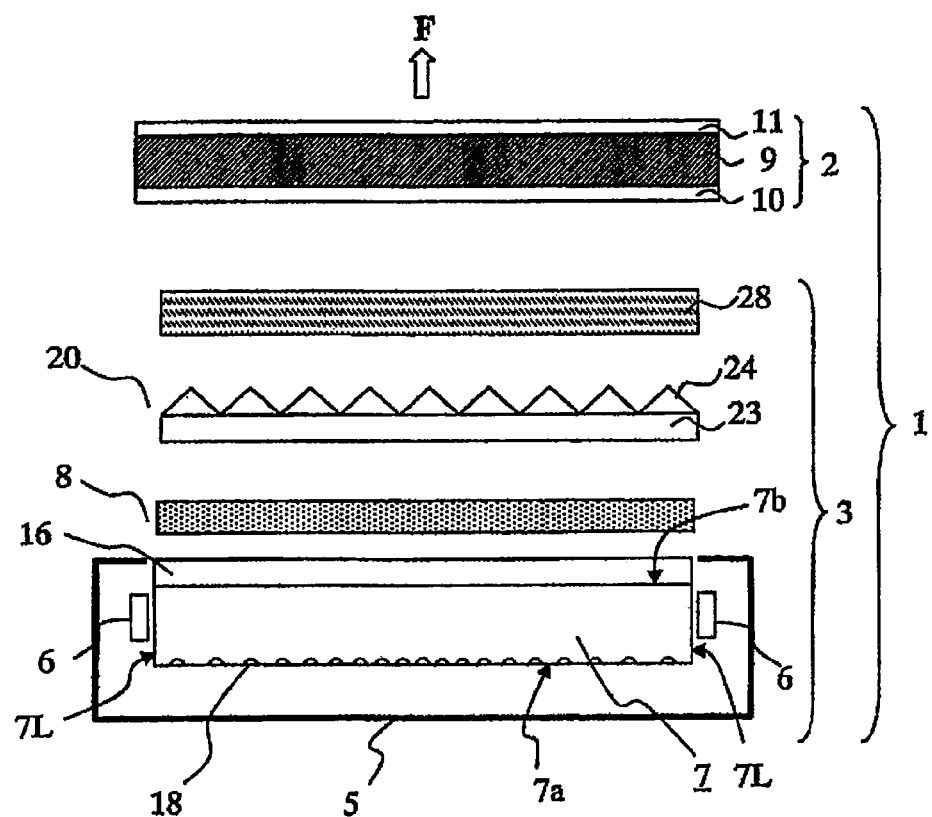
FIG. 1 is a view of a liquid crystal display including an illuminating device equipped with a light guide member according to an embodiment of the present invention.

The embodiments will now be described with reference to the accompanying drawings, wherein like reference numerals designate corresponding or identical elements throughout the various drawings.

FIG. 1 is a schematic sectional view of an illuminating device 3 equipped with a light guide member 7 according to the embodiment of the present invention, and a display 1 equipped with the illuminating device 3; each portion therein represented in a smaller scale does not coincide with an actual portion.

The display illustrated in FIG. 1 is comprised of an image display device 2, and the illuminating device 3 facing a light incident side of the image display device 2.

The image display device, i.e. a liquid crystal display device, 2 is comprised of a liquid crystal layer 9, and two polarization plates 10 and 11 that sandwich the liquid crystal layer 9.

The illuminating device 3 includes at least a laminate and light sources 6. The laminate is comprised of, in sequence, a diffusion sheet 28, a light collection sheet 20, an isotropic light diffusion member 8, a light guide member, i.e. a light guide plate, 7, and a reflection plate 5. The light sources 6 are located on side surfaces of the light guide member 7. The illuminating device 3 is structured such that the diffusion sheet 28 is located to face the image display device 2. The illuminating device 3 according to an embodiment of the present invention is composed of at least the isotropic light diffusion member 8, the light guide member 7, and the light sources 6 in the elements shown in FIG. 1.

The isotropic light diffusion member 8 has a function of isotropically diffusing light output from the light guide member 7. The light collection sheet 20 has a function of collecting light diffused by the isotropic light diffusion member 8 toward the view side F.

The diffusion sheet 28 has functions of: diffusing light collected by the light collection sheet 20; protecting the light collection sheet 20; and reducing the development of a moire interference pattern created based on the periodic pattern formed on the light collection sheet 20 and the periodic pattern formed by the image display device 2. The diffusion sheet 28 can have a function of splitting polarized light from light collected by the light collection sheet 20.

As the isotropic light diffusion member 8, a microlens sheet can be for example used. The microlens sheet is comprised of a transparent base, and a large number of hemispherical microlenses are arrayed on a surface of the transparent base. A prism sheet can be used as the light collection sheet 20. The prism sheet is comprised of a base 23, and plural prisms 24 are formed on a surface of the base 23. As the diffusion sheet 28 having a polarized-light splitting function, a reflective polarization separation sheet, as typified by, for example, DBEF® as a registered trademark of the 3M company can be used. The reflective polarization separation sheet has a function of passing first polarized light therethrough, and reflecting second polarized light thereby. The reflection plate can be comprised of, for example, a housing and white a polyethylene terephthalate film formed on the inner surface of the housing.

As the light sources 6, point light sources can be used. As the point light sources, LEDs can be used. As the LEDs, white LEDs, RGB-LEDs composed of three primary color chips (red, green, and blue chips), or the like can be used. Fluorescent lamps, such as CCFL (Cold Cathode Fluorescent Lamps), can be used as the light sources 6. In FIG. 1, multiple light sources 6 are for example located in the extending direction of each of the opposing end surfaces 7L of the light guide member 7.

The light guide member 7 has an output surface 7b at the side of the direction to the sight, F. On a surface of the light guide member 7 opposite to the output surface 7b, a light deflection surface 7a is formed.

On the light deflection surface 7a, light deflection elements 18 are formed. The light deflection elements 18 are operative to deflect incident light from the light sources 6 toward the output surface 7b. Dot structural elements, concave microlenses, convex microlenses, pyramid structural elements, conical structural elements, or the like can be used as the light deflection elements 18. An amount of light deflected by the light deflection elements 18 toward the side of the output surface 7b is increased with an increase of the area of light deflection elements 18 per unit area. Each of light deflection elements 18 can have a convex or concave shape.

Figure 2A:
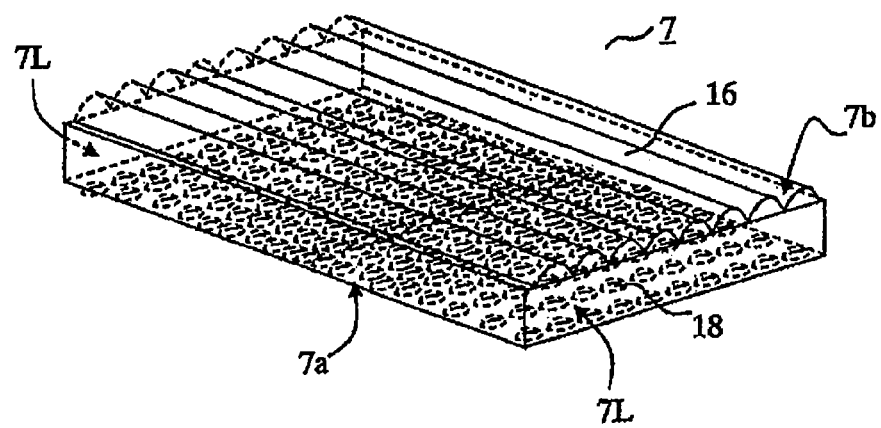
FIG. 2(a) is a perspective view illustrating an example of the light guide member according to the embodiment of the present invention (concave portions, i.e. concave lenses)
Figure 2B:
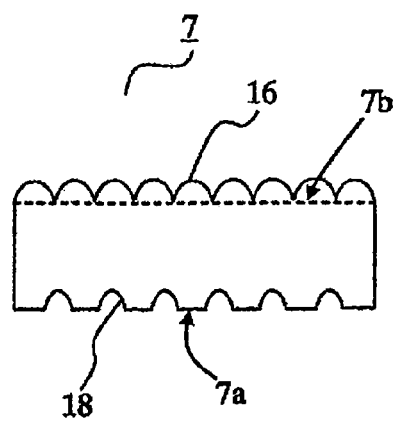
FIG. 2(b) is a cross sectional view of the light guide member according to the embodiment of the present invention when it is cut along a direction parallel to a light incident surface.

FIG. 2(a) is a perspective view of the light guide member 7 when the light deflection elements 18 have concave microlenses, i.e. spherical or hemispherical microlenses. FIG. 2(b) is a cross sectional view of the light guide member 7 taken along a direction parallel to the incident surfaces 7L, and FIG. 2(c) is a cross sectional view of the light guide member 7L taken along a direction orthogonal to the incident surfaces 7L.

Figure 2C:
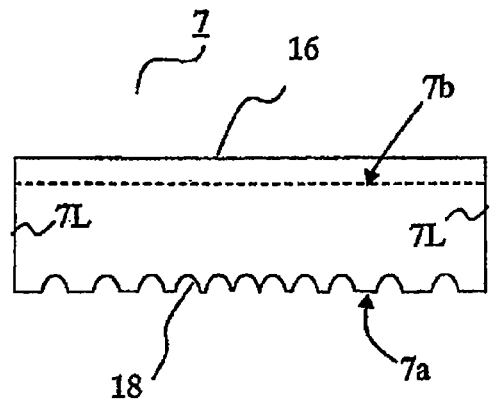
FIG. 2(c) is a cross sectional view of the light guide member according to the embodiment of the present invention when it is cut along a direction orthogonal to the light incident surface.

In the light guide member 7 illustrated in FIGS. 2(a) to 2(c), plural light deflection elements 18 are formed on the light deflection surface 7a such that their intervals vary in the direction orthogonal to the incident surfaces 7L. In other words, the direction orthogonal to the incident surfaces 7L means the direction of an optical axis of incident light through the incident surfaces 7L from the light sources 6. The light deflection elements 18 are operative to deflect light incident from the incident surfaces 7L toward the side of the output surface 7b.

Figure 3A:
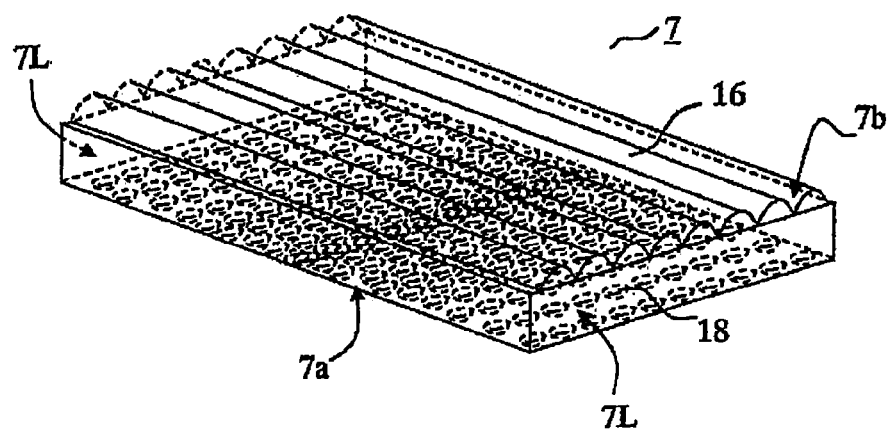
FIG. 3(a) is a perspective view illustrating an example of the light guide member according to the embodiment of the present invention (convex portions, i.e. convex lenses)
Figure 3B:
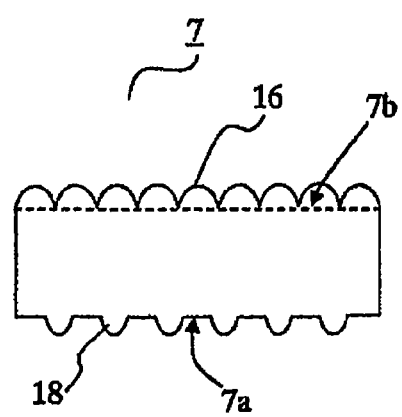
FIG. 3(b) is a cross sectional view of the light guide member according to the embodiment of the present invention when it is cut along a direction parallel to a light incident surface.

FIG. 3(a) is a perspective view of the light guide member 7 when the light deflection elements 18 have convex microlenses, i.e. spherical or hemispherical microlenses. FIG. 3(b) is a cross sectional view of the light guide member 7 taken along a direction parallel to the incident surfaces 7L, and FIG. 3(c) is a cross sectional view of the light guide member 7L taken along a direction orthogonal to the incident surfaces 7L.

Figure 3C:
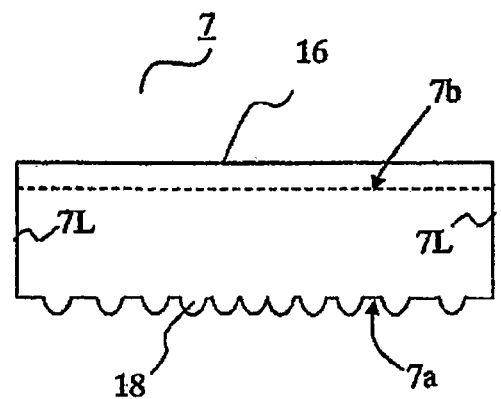
FIG. 3(c) is a cross sectional view of the light guide member according to the embodiment of the present invention when it is cut along a direction orthogonal to the light incident surface.

In the light guide member 7 illustrated in FIGS. 3(a) to 3(c), plural light deflection elements 18 are formed on the light deflection surface 7a such that their intervals vary in the direction orthogonal to the incident surfaces 7L. In other words, the direction orthogonal to the incident surfaces 7L means the direction of an optical axis of incident light through the incident surfaces 7L from the light sources 6. The light deflection elements 18 are operative to deflect light incident from the incident surfaces 7L toward the side of the output surface 7b.

Figure 4:
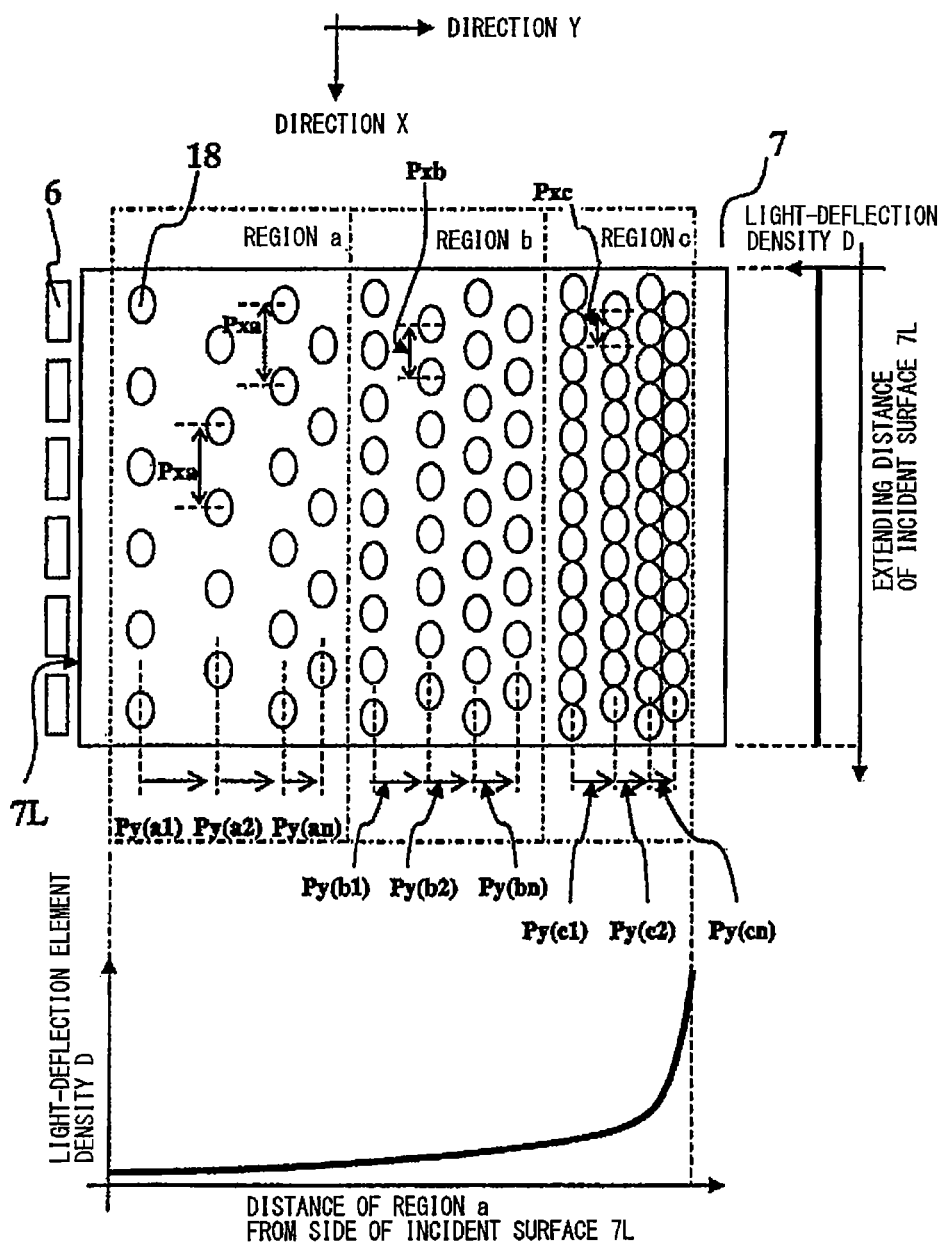
FIG. 4 is a view describing an arrangement pattern of light deflection elements.

FIG. 4 is a view of the light guide member 7 when it is viewed from the light deflection surface 7a. The arrangement of the light deflection elements 18 formed on the light deflection surface 7a of the light guide member 7 will be described in detail with reference to FIG. 4.

The light deflection elements 18 are formed on the light deflection surface 7a of the light guide member 7 constituting the illuminating device according to an embodiment of the present invention. The deflection-element density D, which shows the number of light deflection elements 18 existing per unit area, is maintained substantially constant in the extending direction of an incident surface 7L, i.e. an X direction. In contrast, in a Y direction, the farther away from the incident surface 7L, the higher the deflection-element density D is. That is, the light deflection elements 18 have a sparse and dense distribution such that, the nearer to the incident surface 7L, the sparser the light deflection elements 18 are, and the farther from the incident surface 7L, the denser the light deflection elements 18 are.

The light deflection elements 18 have an arrangement pattern illustrated in FIG. 4; the arrangement pattern is divided into plural regions. FIG. 4 illustrates an example that the region of the arrangement pattern is separated into three regions a to c. The number of divisions of the arrangement pattern and the size of each separate region can be appropriately selected by a designer.

Light deflection elements 18 located in one separate region are arranged at regular unit intervals in the X direction. In contrast, in the Y direction, the farther away from the incident surface 7L light deflection elements 18 are, the shorter their unit intervals are and the more the corresponding deflection-element density D is.

For example, in the region a illustrated in FIG. 4 for example, the unit intervals between the light deflection elements 18 in the X direction are set to be a constant value of Pxa. In contrast, the unit intervals between the light deflection elements 18 in the Y direction vary, from the one closest to the incident surface 7L, as Py(a1), Py(a2), ..., and Py(an), so that the unit interval farthest from the incident surface 7L is the narrowest in all the intervals.

In the region b illustrated in FIG. 4, the unit intervals between the light deflection elements 18 in the X direction are set to be a constant value of Pxb that is shorter than the value Pxa. Specifically, the unit intervals in the X direction discontinuously change through the boundary of the region a and region b. This results in the number of light deflection elements 18 of located in the region b and aligned in the X direction per one row being greater than that of light deflection elements 18 located in the region a and aligned in the X direction per one row.

The unit intervals between light deflection elements 18 in the X direction, which vary for the respective regions, make it possible to reduce the visibility of the light deflection elements 18, and to provide the illuminating device 3 having higher luminance.

Let us focus on the unit intervals, i.e. Py(an), between the deflection elements 18 in the Y direction, located in the region a closest to the incident surface 7L; the unit intervals are closest to the boundary between the region a and the next region b adjacent to the region a. In addition, let us focus on the unit intervals, i.e. Py(b1), between the deflection elements 18 in the Y direction, located in the region b far from the incident surface 7L; these unit intervals are closest to the boundary between the region a and the next region b. At that time, the latter unit intervals are set to be longer than the former unit intervals, that is, the unit intervals Py(b1) are set to be longer than the unit intervals Py(an).

Specifically, the unit intervals between the light deflection elements 18 in the Y direction continuously vary in a region, but the unit intervals between the light deflection elements 18 in the Y direction vary through the boundary between adjacent regions. The unit intervals between the light deflection elements 18 in the Y direction in each region, which are adjacent to a corresponding boundary at the side of the incident surface 7L, are not especially limited in length therebetween. That is, the unit intervals Py(a1), the unit intervals Py(b1), and the unit intervals Py(c1) illustrated in FIG. 4 are not especially limited in length therebetween.

Similarly, the unit intervals between the light deflection elements 18 in the Y direction in each region, which are far from a corresponding boundary at the side of the incident surface 7L, are unlimited in length therebetween. That is, the unit intervals Py(an), the unit intervals Py(bn), and the unit intervals Py(cn) illustrated in FIG. 4 are unlimited in length therebetween.

Next, a range for calculation of the deflection-element density D will be described.

Figure 5:
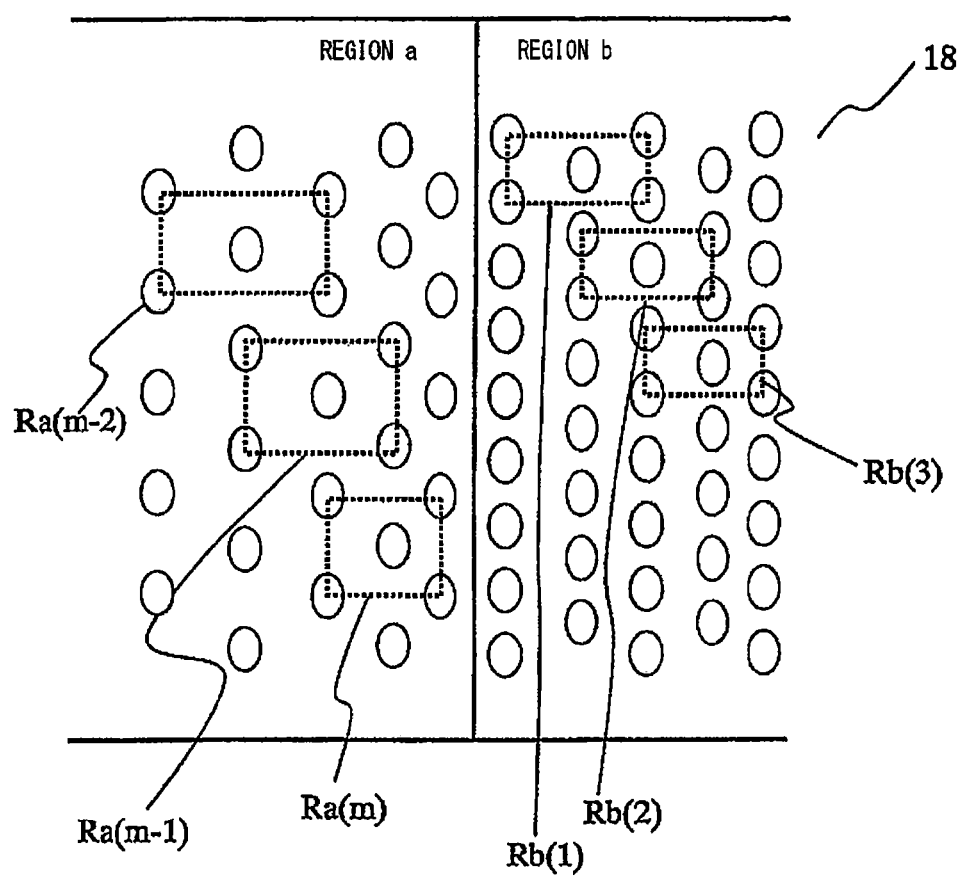
FIG. 5 is a view describing an area used to calculate a light-deflection element density.

Setting a very small range within which the deflection-element density D is calculated could make the deflection-element density D vary depending on the set positions of the range. In contrast, setting a very large range within which the deflection-element density D is calculated could make many calculated values of the deflection-element density D averaged independently of the corresponding set positions of the range. For example, FIG. 5 is a schematic view of the relationship between the arrangement of light deflection elements 18 in the X direction and ranges for calculating the deflection-element density D. In the first embodiment, the deflection-element density D in the X direction in a region is constant because the unit intervals Px in the X direction in the same region are constant. Thus, a range within which the deflection-element density D is calculated does not depend on the length of the corresponding range in the X direction.

In contrast, the deflection-element density D in the Y direction in a region is determined depending on the lengths between adjacent light deflection elements 18 in the Y direction because the father away from an incident surface 7L, the less the unit intervals Py in the Y direction in the same region are. Specifically, dashed rectangular ranges illustrated in FIG. 5 determine corresponding values of the deflection-element density D. In the region a illustrated in FIG. 5, values of the deflection-element density D in, for example, respective ranges Ra(m−2), Ra(m−1), and Ra(m) are calculated. Similarly, in the region b, values of the deflection-element density D in, for example, respective ranges Rb(1), Rb(2), Rb(3), ..., are calculated.

The arrangement pattern of the light deflection elements 18 in the X-Y direction in the light guide member 7 according to the first embodiment is structured such that the rows of the light deflection elements 18 are arranged in the Y direction while the rows are alternately shifted by (½)·Px in the X direction.

Next, how the illuminating device 3 has higher luminance will be described.

Figure 6:
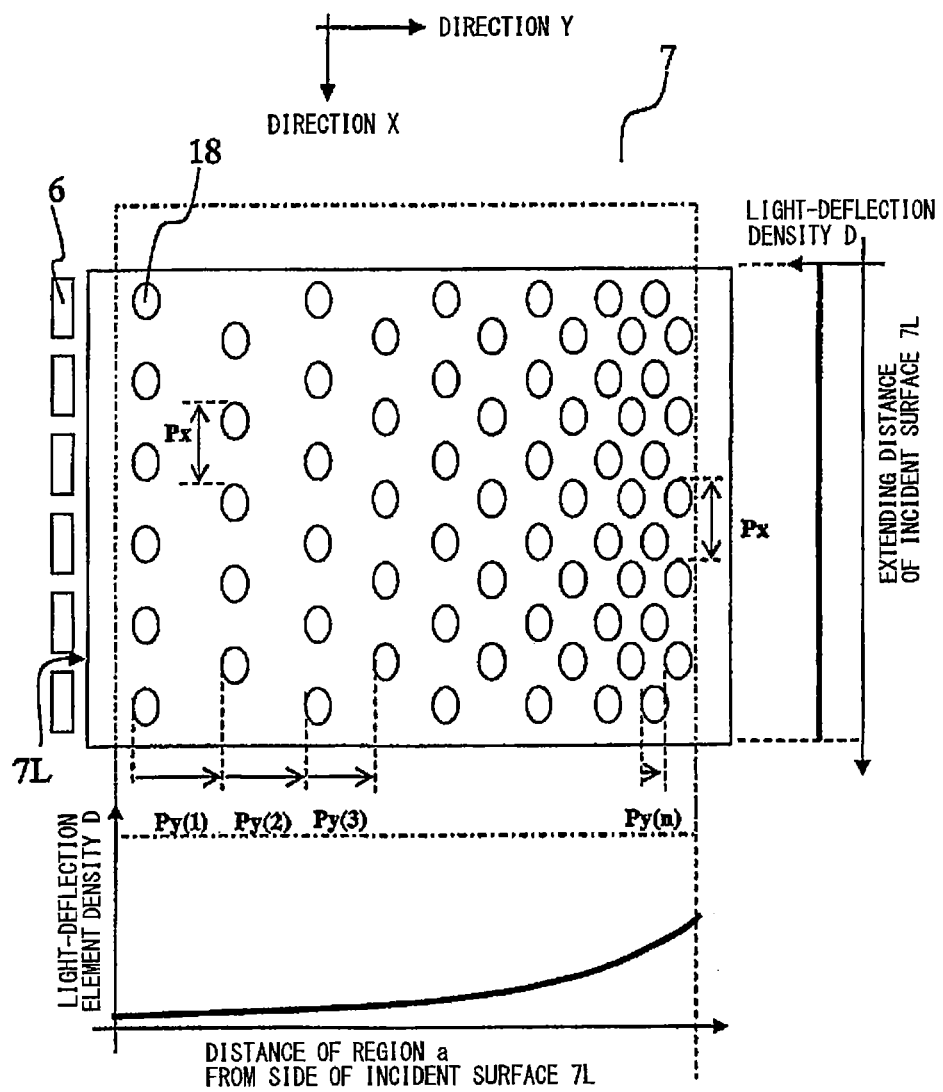
FIG. 6 is a view describing an arrangement pattern of light deflection elements.

FIG. 6 illustrates an example where the arrangement pattern of the light deflection elements 18 is designed without being divided into plural groups. In this example, the unit intervals between the light deflection elements 18 in the X direction are set relative to the deflection-element density D of light deflection elements 18 located closest to an incident surface 7L. The farther away from the incident surface 7L, the shorter the unit intervals Py(i) are. However, because the unit intervals Px of light deflection elements 18 in the X direction are wide, the deflection-element density D of light deflection elements 18 located farthest from the incident surface 7L is kept small. That is, a large part of light incident from the incident surface 7L into the light guide member 7 may escape from one surface opposite to the incident surface 7L. This may result in difficulty providing the illuminating device 3 with higher luminance.

Figure 7:
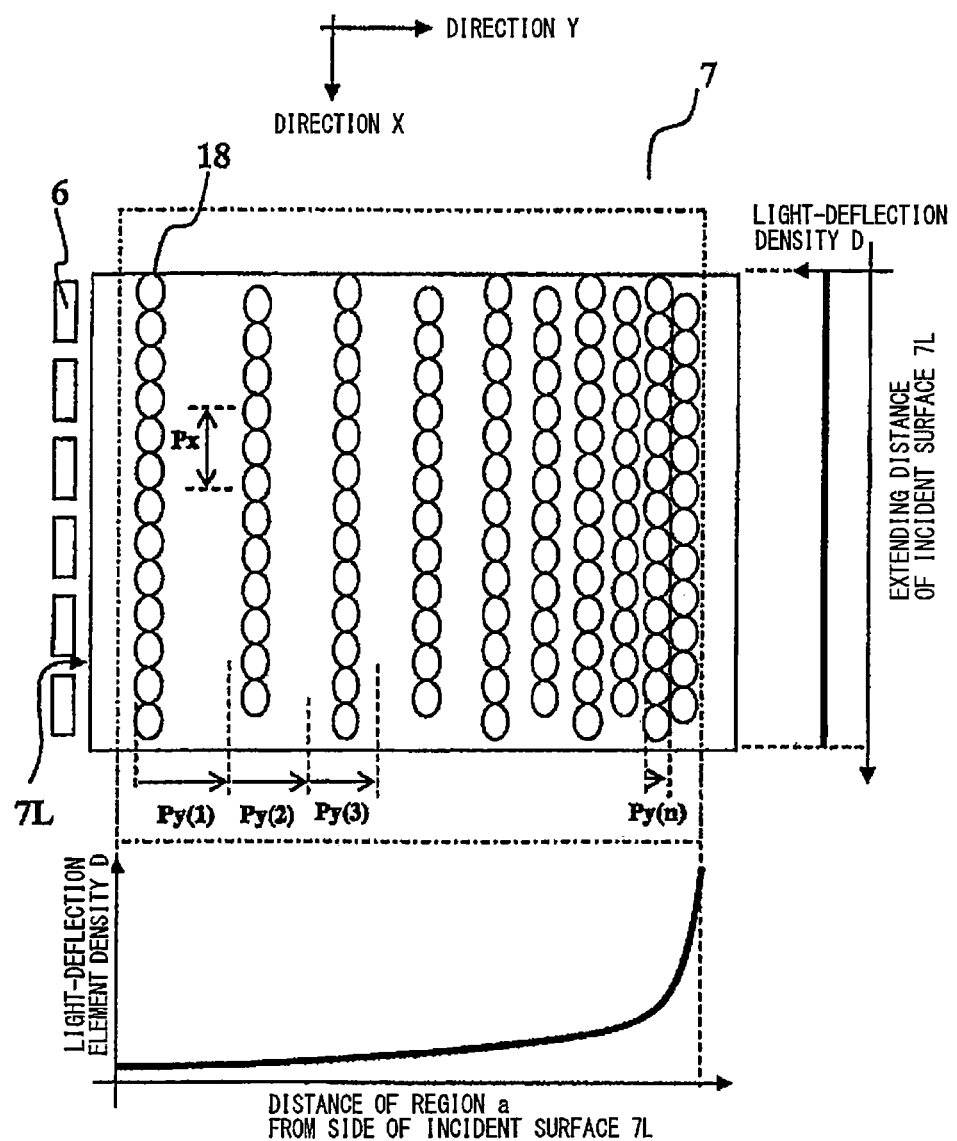
FIG. 7 is a view describing an arrangement pattern of light deflection elements.

On the other hand, FIG. 7 illustrates another example where the arrangement pattern of the light deflection elements 18 is designed without being divided into plural regions. In this example, the unit intervals between the light deflection elements 18 in the X direction are set relative to the deflection-element density D of light deflection elements 18 located farthest from an incident surface 7L. With this arrangement, a large part of light incident from the incident surface 7L into the light guide member 7 can be output from the output surface 7b. However, the unit intervals of light deflection elements 18 in the Y direction closest to the incident surface 7L may become longer, resulting in a problem in visibility of the light deflection elements 18 set forth above. That is, this may result in the light deflection elements 18 being visibly recognized as linear lights extending in the X direction.

In contrast, as described above, the light deflection elements 18 of the light guide member 7, which constitutes the illuminating device 3 according to an embodiment of the present invention, have the arrangement pattern; the arrangement pattern is divided into plural regions. In each region, light deflection elements 18 are arranged with regular unit intervals in the X direction, and light deflection elements 18 in the Y direction are arranged such that, the farther away from an incident surface 7L, the smaller the corresponding unit intervals are. In addition, the closer to an incident surface 7L a region is, the longer the unit intervals between light deflection elements 18 in the X direction located in the region are. In other words, the father away from an incident surface 7L a region is, the shorter the unit intervals between light deflection elements 18 in the X direction located in the region are. This makes it possible to reduce the visibility of the light deflection elements 18, and to provide the illuminating device 3 having higher luminance.

Each of the regions can be separated into plural sections in the X direction. This can result in reduction of variations in surface luminance with higher accuracy.

The light deflection elements 18 formed on the light deflection surface 7a of the light guide member 7 constituting the illuminating device 3 according to an embodiment of the present invention have a sparse and dense distribution. The sparse and dense distribution is formed such that, the nearer to an incident surface 7L, the sparser the light deflection elements 18 are, and the farther from the incident surface 7L, the denser the light deflection elements 18 are. If the illuminating device 3 according to an embodiment of the present invention is applied to a backlight of a liquid crystal display for example, it is desirable to increase surface-center luminance while maintaining uniformity in in-plane luminance within a certain standard. In view of this, the light deflection elements 18 formed on the light guide member according to an embodiment of the present invention have a sparse and dense distribution that increases surface-center luminance without sacrificing uniformity in in-plane luminance of the illuminating device 3.

Multiple unit lenses 16 are formed on the output surface 7b of the light guide member 7. The unit lenses 16 are arranged to extend in a direction orthogonal to an incident surface 7L.

Next, functions of the unit lenses 16 will be described with reference to FIG. 8.

Figure 8A:
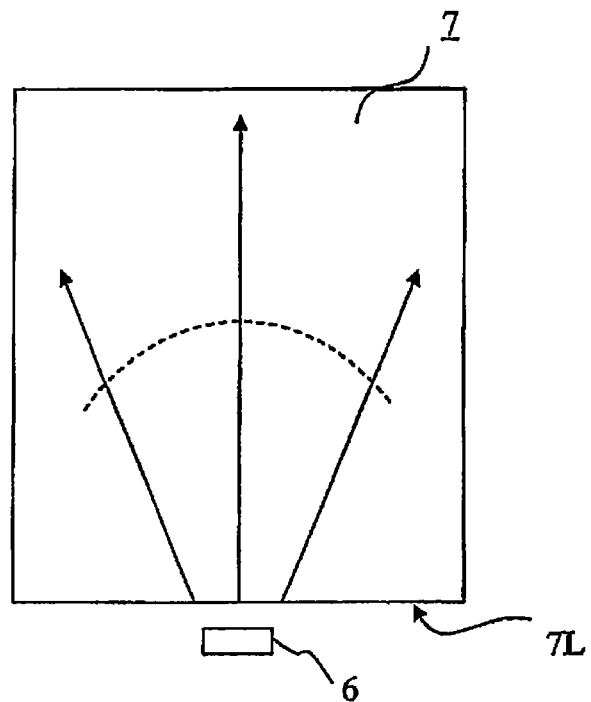
FIG. 8(a) is a view illustrating light propagated in a fan-like shape when the light guide member with no unit lenses is viewed from the output-surface side.
Figure 8B:
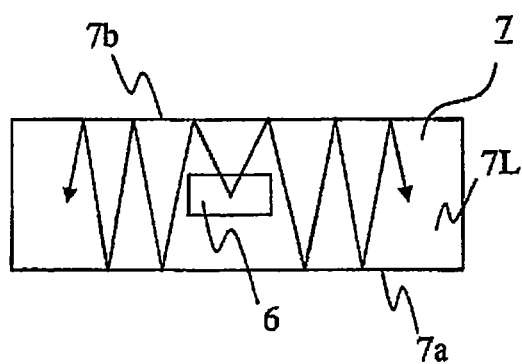
FIG. 8(b) is a cross sectional view of the light guide member with no unit lenses when it is cut along a direction parallel to the light incident surface, and is a view illustrating light propagated in the light guide member.

FIG. 8(*a*) is a plan view of a light guide member 7 with no unit lenses 16. When no unit lenses 16 are used, light output from a light source 6 is incident from a corresponding incident surface 7L into the light guide member 7. The incident light is guided in the light guide member 7 while spreading in a fan-like form. FIG. 8(*b*) is a view illustrating the path of light while the light guide member 7 is viewed from the side of the input surface 7L. The light is expandingly propagated while repeating internal reflections between the output surface 7b and the light deflection surface 7a.

Figure 9A:
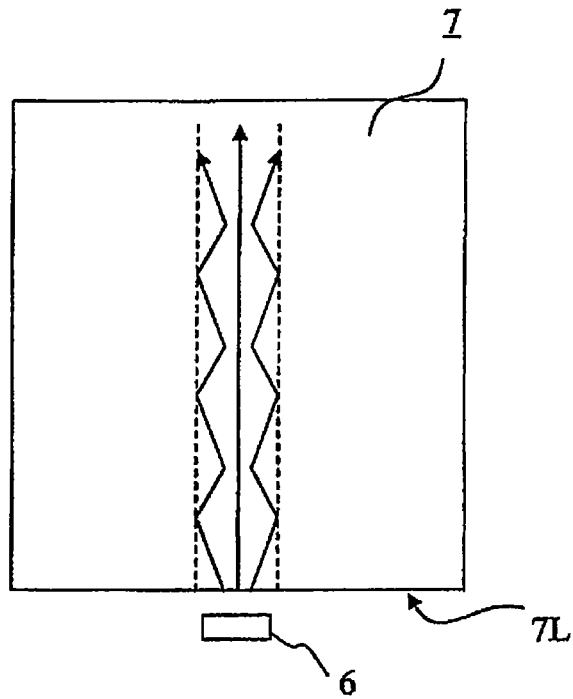
FIG. 9(a) is a view illustrating light propagated in the light guide member with unit lenses is viewed from the output-surface side.
Figure 9B:
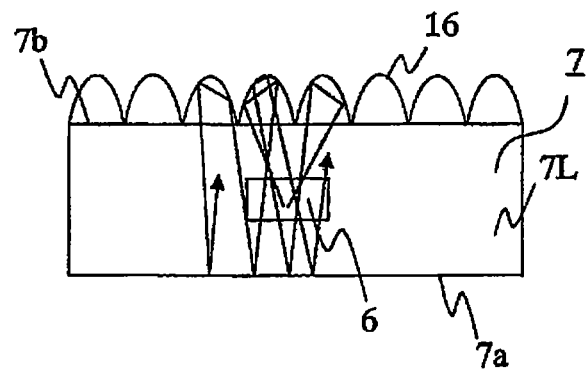
FIG. 9(b) is a cross sectional view of the light guide member with the unit lenses when it is cut along a direction parallel to the light incident surface, and is a view illustrating light propagated in the light guide member.

In contrast, FIG. 9(*a*) is a plan view of a light guide member 7 on which the unit lenses 16 are formed. When the unit lenses 16 are used, light incident from an incident surface 7L is guided in the light guide member 6 while: repeatedly reflecting by inner side surfaces of the unit lenses 16, and changing in its orientations with respect to the incident surface 7L. FIG. 9(*b*) is a view illustrating the path of light while the light guide member 7 is viewed from the side of the input surface 7L. The light is substantially lineally propagated without spreading fanwise in comparison to the light guide member 7 with no unit lenses 16 because orientations of the light change by reflections from the unit lenses 16.

Figure 10A:
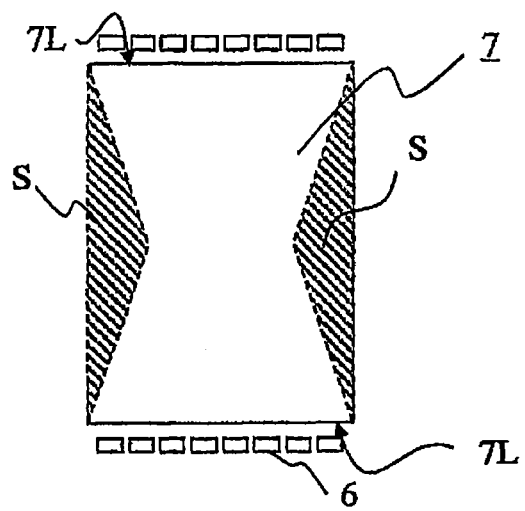
FIG. 10(a) is a view illustrating a luminance distribution when the light guide member provided with light sources at its two sides and with no unit lenses is viewed from the output-surface side.
Figure 10B:
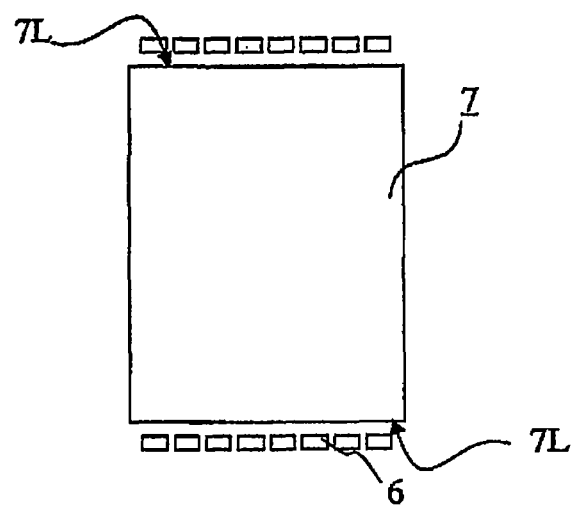
FIG. 10(b) is a view illustrating a luminance distribution when the light guide member provided with light sources at its two sides and with unit lenses is viewed from the output-surface side.
Figure 10C:
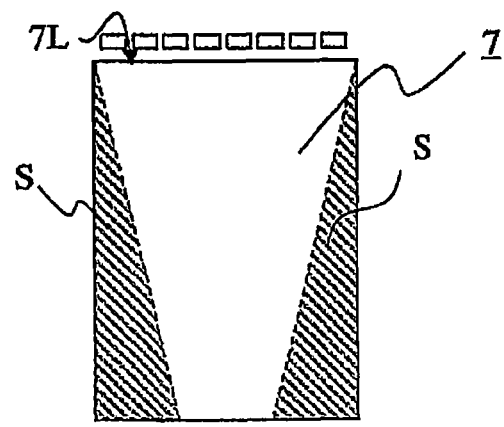
FIG. 10(c) is a view illustrating a luminance distribution when the light guide member provided with light sources at its one side and with no unit lenses is viewed from the output-surface side.

FIGS. 10(*a*) and (*b*) illustrate luminance distributions when:
plural light sources 6 are located close to two sides, i.e. incident surfaces 7L, of the light guide member 7; and
the light deflection members 18 are arranged such that, the closer to the incident surfaces 7L, the sparser the light deflection elements 18 are, and the farther from the incident surfaces 7L, the denser the light deflection elements 18 are.

That is, the light deflection elements 18 have a substantially uniform one-dimensional sparse and dense pattern in a direction parallel to the incident surfaces 7L.

The light guide member 7 can have uniform luminance over the entire output surface. For example, the light deflection elements 18 can have formed a sparse and dense pattern that increases luminance in the center of the light guide member 7 at the highest level therein.

FIG. 10(*a*) illustrates a luminance distribution by the light guide member 7 with no unit lenses 16. No unit lenses 16 formed on the output surface 7b of the light guide member 7 in which the light deflection elements 18 having one-dimensional sparse and dense pattern are formed result in triangular dark portions S at both sides of the light guide member 7 at which no light sources 6 are located. This is due to light incident from the light sources 6 into the light guide member 7 being guided while expanding in a fan-like shape (see FIG. 8). That is, an escape of light from the sides of the light guide member 7 at which no light sources 6 are located causes the triangular dark portions S. Thus, the light deflection elements 18 having a two-dimensional sparse and dense pattern may be formed in order to avoid the generation of the dark portions S.

In contrast, FIG. 10(*b*) illustrates a luminance distribution by the light guide member 7 on which the unit lenses 16 are formed. As illustrated in FIG. 9, light incident from the light sources 6 into the light guide member 7 travels in a substantially straight line within a predetermined range while repeatedly being reflected by the unit lenses 16. This results in no dark portions S as illustrated in FIG. 10(*a*).

FIG. 10(*c*) illustrates luminance distributions when:
plural light sources 6 are located close to one side, i.e. an incident surface 7L, of the light guide member 7; and
the light deflection members 18 are arranged such that, the closer to the incident surface 7L, the sparser the light deflection elements 18 are, and the farther from the incident surface 7L, i.e. the closer to the center of the light guide member 7, the denser the light deflection elements 18 are.

As illustrated in FIG. 10(*c*), let us consider a case where no unit lenses 16 are formed on the output surface 7b of the light guide member 7 in which the light deflection elements 18 having one-dimensional sparse and dense pattern are formed. In this case, triangular dark portions S are formed at both sides of the light guide member 7 at which no light sources 6 are located.

It is desirable that the display 1 using the light guide member 7 according to an embodiment of the present invention has the highest level of luminance at the center of its screen. The light deflection elements 18 of the light guide member 7 formed with the unit lenses 16 have a one-dimensional sparse and dense pattern. For this reason, in a direction orthogonal to an incident surface 7L, suitable adjustment of the sparse and dense pattern can increase luminance at the center of the screen. However, in a direction parallel to an incident surface 7L, luminance is substantially uniform. Thus, adjustment of current applied to the light sources 6 makes it possible to adjust luminance such that, the closer to the center of the screen, the higher the luminance is.

Figure 11:
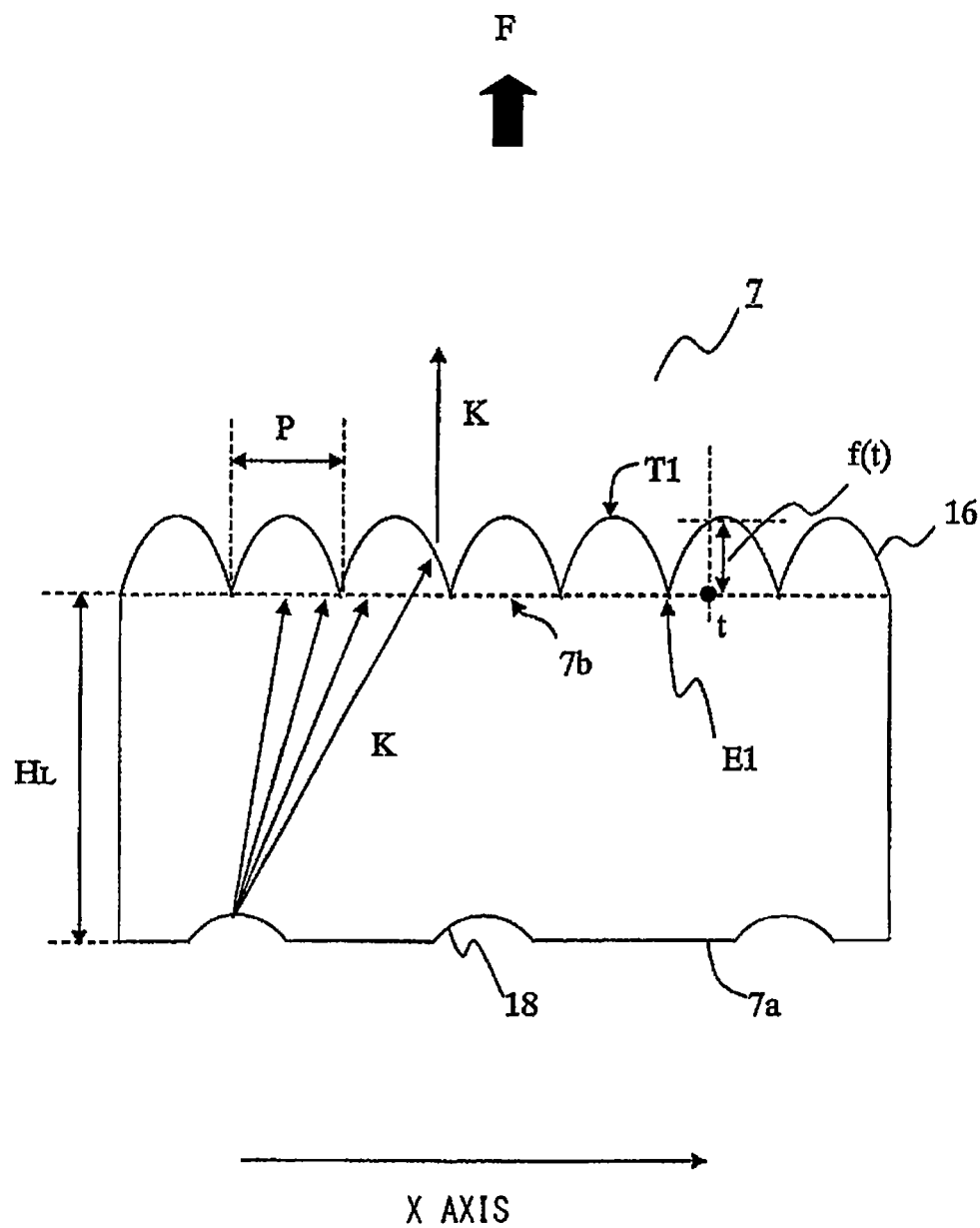
FIG. 11 is a cross sectional view of the light guide member with unit lenses when it is cut along a direction parallel to the light incident surface.

As illustrated in FIG. 11, when viewed in cross section, the unit lenses 16 have a rounded top and bent side surfaces located at both sides of the rounded top; the rounded top and the curved side surfaces are smoothly connected to each other to form a curved surface. An angle of tangent at the top T1 of a unit lens 16 is set to be 0 degrees, and the angle of tangent gradually increases from the top toward the output surface 7b. The angle of tangent has a largest value at an end E1 of the unit lens 16. Thus, if point light sources are located at the side of the light deflection surface 7a of the light guide member 7 on which plural unit lenses 16 are arranged, oblique light K emitted from the point light sources is refracted by the surface of the unit lenses 16, so that the oblique light K rises toward the front. If the point light sources are viewed from the output surface side of the light guide member 7, they are visibly recognized as linear light sources.

Figure 12A:
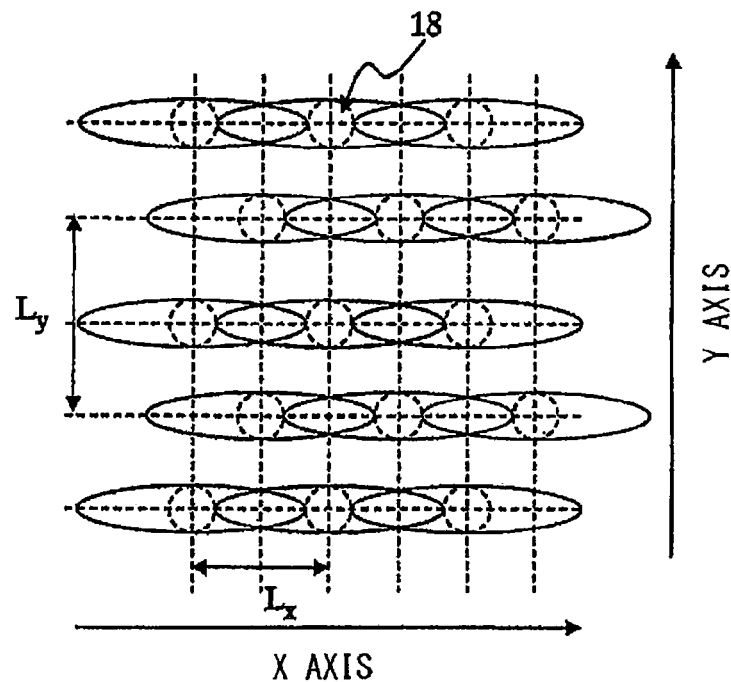
FIG. 12(a) is a view illustrating an example of how images of light deflection elements are seen when the light guide member with no unit lenses is viewed from a view side.
Figure 12B:
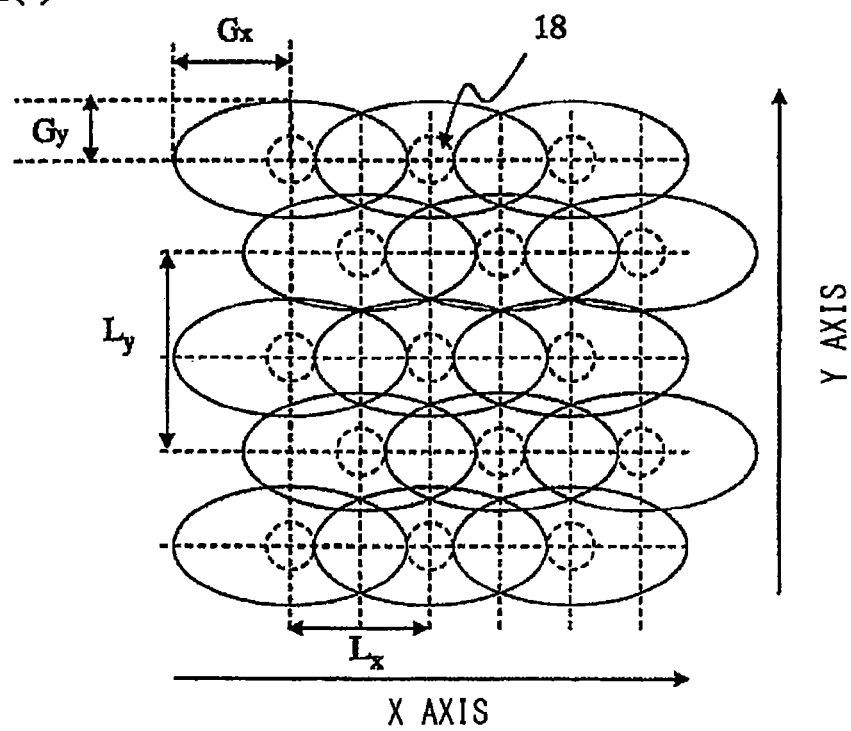
FIG. 12(b) is a view illustrating an example of how images of light deflection elements are seen when the light guide member with unit lenses is viewed from the view side.

Specifically, if each of the circular or ellipsoidal light deflection elements 18 (see FIGS. 2 and 3) is taken as a point light source, the light deflection elements 18, which linearly spread in the direction of an X axis, are seen when viewed from the side of the output surface 7b of the light guide member 7 (see FIG. 12(a)). Note that the direction of the X axis is defined as a direction parallel to the incident surfaces 7L, and the Y axis is defined as a virtual axis extending vertically with respect to the incident surfaces 7L. The light deflection elements 18, which linearly spread in the direction of the X axis, are aligned in the direction of the X axis at regular pitches $L_x$. The light deflection elements 18 are aligned in the direction of the Y axis at regular pitches $L_y$. FIGS. 12(a) and 12(b) illustrate the light deflection elements 18 as dashed lines, and illustrate images of the light deflection elements 18 when viewed from the view side F as solid lines.

Note that a pitch Lx of the light guide member according to an embodiment of the present invention corresponds to a unit interval Px. A pitch Ly corresponds to the sum of two adjacent unit intervals. For example, pitches Ly respectively show the sum of unit intervals Py(an) and Py(an+1), the sum of unit intervals Py(bn) and Py(bn+1), and the sum of unit intervals Py(cn) and Py(cn+1) illustrated in FIG. 4.

The isotropic light diffusion member 8 is located at the side of the output surface 7b of the light guide member 7. Light, output from the light guide member 7, is diffused by the isotropic light diffusion member 8, and thereafter, output therefrom as diffused light. For this reason, images (see FIG. 12(b)) of the light deflection elements 18 formed by the light guide member 7 on which the isotropic light diffusion member 8 is mounted are visibly recognized as more diffused light in both the directions of the X and Y axes as compared to images (see FIG. 12(a)) of the light deflection elements 18 formed solely by the light guide member 7. At that time, the amount of spread of the images in the direction of the X axis is represented as $G_x$, and the amount of spread of the images in the direction of the Y axis is represented as $G_y$. The amounts of spreads $G_x$ and $G_y$ can be obtained by the following procedures. Note that the spread of an image of a light deflection element 18 is defined as a distance between the outline of the image of the light deflection element 18 and the center of the light deflection element 18.

Let us assume that: arrangement pitches of the light deflection elements 18 in the direction of the X axis are represented as $L_x$; arrangement pitches of the light deflection elements 18 in the direction of the Y axis are represented as $L_y$; the thickness of the light guide member 7 is represented as $H_L$; the refractive index of the light guide member 7 is represented as $N_L$; the light deflection elements 18 have an ellipsoidal shape; the width of a light deflection element 18 in the direction of the X axis is represented as $a_x$; and the width of a light deflection element 18 in the direction of the Y axis is represented as $a_y$.

Referring to FIG. 11, when an end of a unit lens 16 is set to 0, measured displacement in the direction of the X axis therefrom is represented as t, a distance between an edge of a unit lens 16 and the output surface 7b of the light guide member 7 is represented as f(t), and a pitch of a unit lens 16 is represented as P.

Figure 13A:
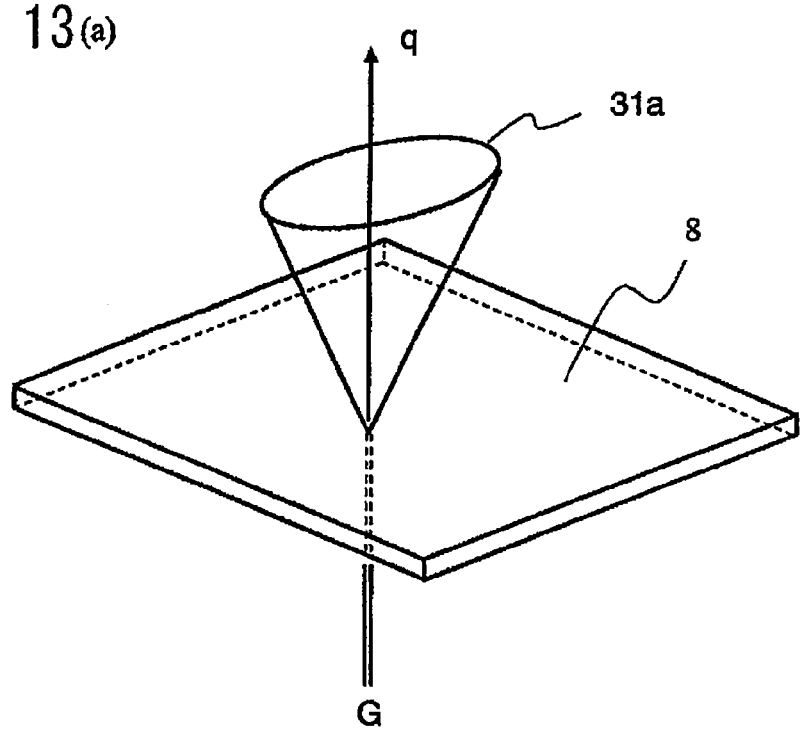
FIG. 13(a) is a view illustrating how light is diffused when collimated light is orthogonally incident into an isotropic light diffusion member.
Figure 13B:
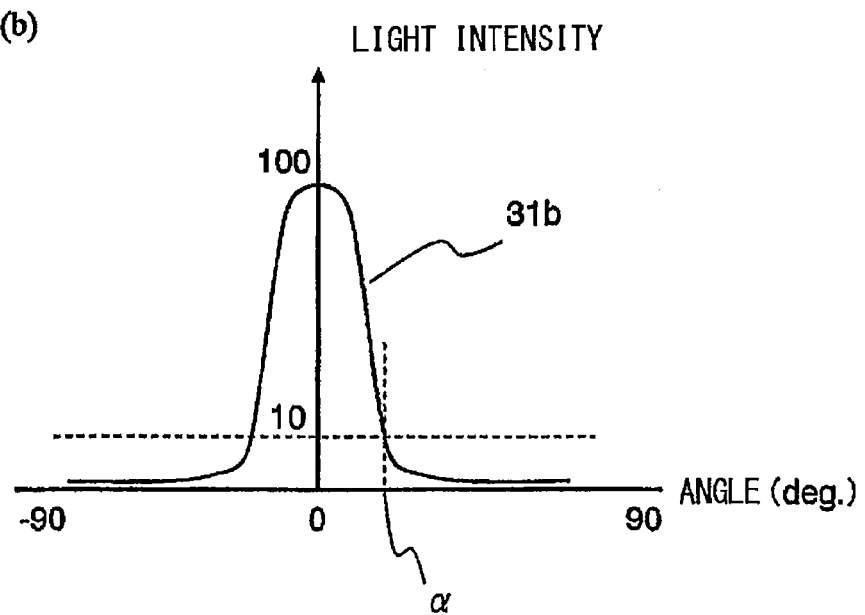
FIG. 13(b) is a graph illustrating an angular distribution of light intensity when the collimated light is orthogonally incident into the isotropic light diffusion member.

FIG. 13(a) schematically illustrates diffused light 31a generated when collimated light G is incident into the isotropic light diffusion member 8 in a direction q orthogonal to the isotropic light diffusion member 8. FIG. 13(b) illustrates a graph showing an angular distribution 31b of the diffused light 31a. In FIG. 13(b), the term "angle" is defined as an angle of the diffused light 31a with respect to the vertical direction q of the isotropic light diffusion member 8. Because the isotropic light diffusion member 8 isotropically diffuses the collimated light G, the angle distribution 31b has a symmetric distribution. Reference character α illustrated in FIG. 13(b) represents an angle of the diffused light at which the magnitude of the diffused light becomes one tenth, i.e. $\frac{1}{10}$, of the maximum level of the diffused light. The angle α will be referred to as a diffusion angle.

Hereinafter, we consider only light diffused within the diffusion angle α when the collimated light G is incident into the isotropic light diffusion member 8. This is because light diffused out of the diffusion angle α has a weak intensity, so that it is possible to ignore the effects of the light on the spread of images of the light deflection elements 18.

Figure 14:
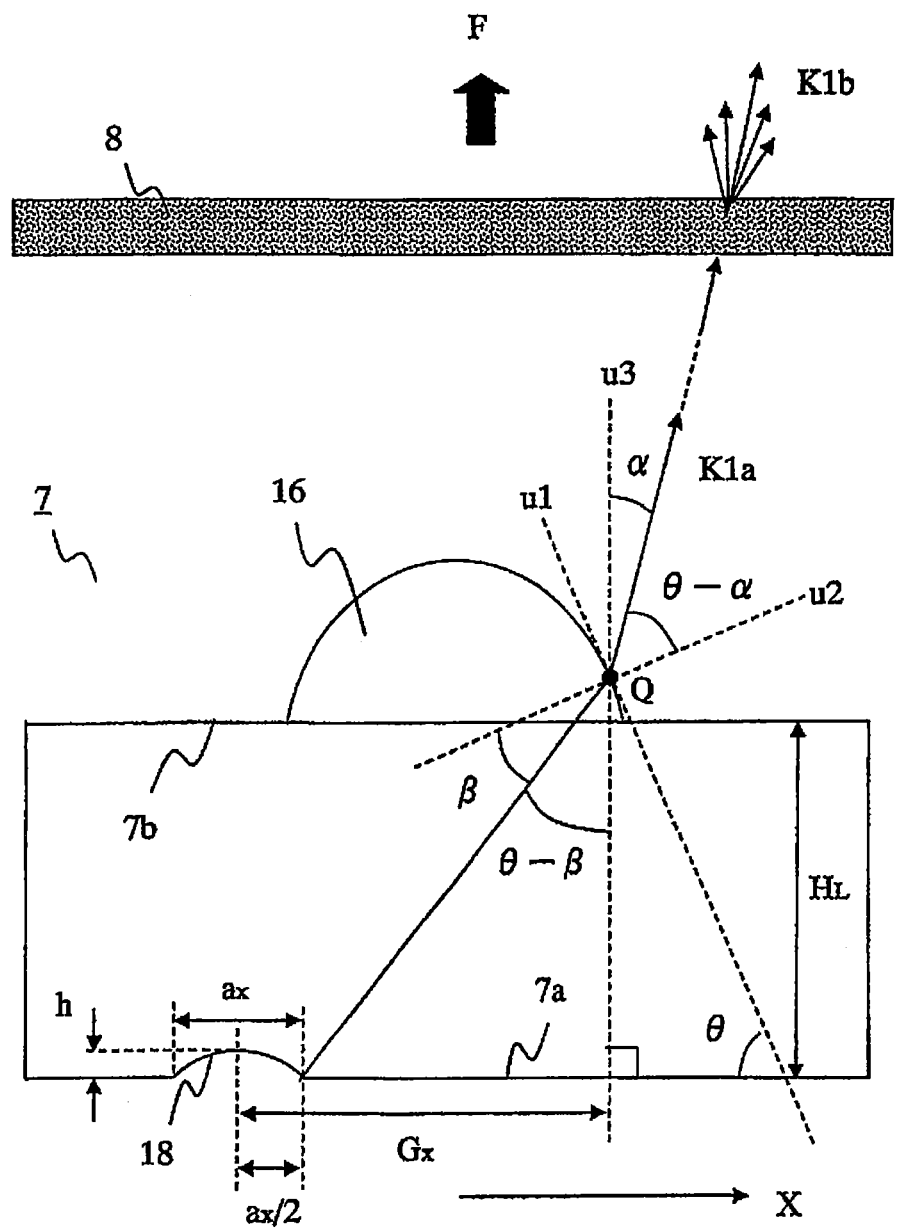
FIG. 14 is a cross sectional view of the light guide member and the isotropic light diffusion member when they are cut along a direction parallel to the light incident surface, and is a view illustrating how light output from a light deflection element rises up by a unit lens and the isotropic light diffusion member.

FIG. 14 illustrates a path of a light beam in the light guide member 7 when light is output from the light guide member 7 while the light beam is inclined by the angle α with respect to the normal direction of the output surface 7b. In order to simply illustration in FIG. 14, one unit lens 16 is only illustrated, but multiple unit lenses 16 are actually used. In addition, in FIG. 14, the scale of the unit lens 16 is extremely enlarged in comparison to the scale of the corresponding actual unit lens 16.

Reference character θ illustrated in FIG. 14 represents an average inclination angle of the unit lens 16 at its point Q close to a corresponding end of the unit lens 16. The inclination angle θ, which is expressed by the following formula (6), shows an average inclination angle of a region of the unit lens 16 from the corresponding end; the region is equivalent to tenth part of a pitch from the corresponding end.

$$\theta = \tan^{-1}\left[\frac{10}{P}\int_0^{1/10 P}\left|\frac{df(t)}{dt}\right|dt\right]. \tag{6}$$

Why the region is defined as tenth part of a pitch is as follows: Specifically, it is assumed that the total amount of light incident into the unit lens 16 is referred to as I. In this assumption, an amount of light being deflected upwards at a portion of the unit lens 16 close to a corresponding end thereof has at least tenth part of the total amount I of light incident into the unit lens 16 or thereabout permits the expansion of a light deflection element 18 based on the upwardly deflected light to be visually checked.

Reference character u1 represents a tangent line at the point Q of the unit lens 16, and reference character u2 represents a line passing through the point Q and orthogonal to the tangent line u1. Reference character u3 represents a line passing through the point Q3 and orthogonal to the light deflection surface 7a.

Reference character β represents an incident angle of light at the point Q of the unit lens 16. The refraction angle of light output from the unit lens 16 is represented as θ−α. Snell's law leads to the following formula (7) satisfied between α and β:

$$\beta = \sin^{-1}\left(\frac{\sin(\theta - \alpha)}{N_L}\right). \tag{7}$$

An angle formed between the light beam output from the corresponding light deflection element 18 and the normal direction of the light deflection surface 7a is expressed as θ−β.

Thus, light output from a light deflection element 18 with an angle (θ−β) with respect to the normal direction of the light deflection surface 7a rises up by the region of the unit lens 16 close to the corresponding end thereof. This results in output light K1a being output in an orientation inclined with respect to the normal direction of the light output surface 7a by the angle α. The output light K1a is incident into the isotropic light diffusion member 8. T at the incident angle α, so that diffused light K1b is output, part of which is output to the view side F.

As described above, the diffusion angle α represents an angle of diffusion when collimated light is incident into the isotropic light diffusion member 8. For this reason, when the light K1a is incident into the isotropic light diffusion member 8 from an oblique orientation thereto, the incident angle set to be equal to or smaller than the diffusion angle α makes it possible to diffuse a sufficient quantity of light in the view side F. The sufficient quantity of light means a minimum quantity of light that permits the corresponding light to be visibly recognized. For this reason, viewing the isotropic light diffusion member 8 from the view side F results in the diffused light K1b based on the output light K1a being visually recognized.

When being viewed from the view side F with the isotropic light diffusion member 8 mounted on the light guide 7, the light deflection elements 18 are respectively observed as images spreading in both the directions of the X and Y axes. The spread in the direction of the X axis is greater than that of the direction of the Y axis because of the unit lenses 16 effecting light being deflected upwards.

The amount of spread $G_x$ of a light deflection element 18 in the X direction is represented by the length illustrated by an arrow in FIG. 14. To be more accurate, an extent of light through a space between the light guide member 7 and the isotropic light diffusion member 8 may be additionally considered. However, because actual illuminating devices 3 are designed such that the light guide member 7 is in contact with the isotropic light diffusion member 8, such a small extent is ignored.

Thus, the amount of spread $G_x$ can be calculated in accordance with the following formula (8):

$$G_x = H_L \tan(\theta - \beta) + \frac{a_x}{2}. \tag{8}$$

For the first term of the formula representing $G_x$, the distance between the point Q and the output surface 7b may be additionally considered to be more accurate. On this point, light guide members 7 used for television sets may have a thickness, i.e. a height, within the range from 3 mm to 4 mm inclusive, but the unit lenses 16 have a height within the range from several dozen μm to a hundred μm inclusive. For this reason, such a micro height of the unit lenses 16 is ignored, so that the height is approximated as $H_L$. When a light guide member 7 is used for monitors of notebook personal computers and/or tablet personal computers, the light guide member 7 is preferably designed to have a thickness equal to or smaller than 1 mm. In this case, the height of the unit lenses 16 may be designed to be sufficiently smaller than the thickness of the light guide member 7. Thus, it is possible to ignore such a micro height of the unit lenses 16. For example, the light guide member 7 has a thickness of 0.5 mm, the height of the unit lenses 16 is set to be within the range from several μm to 30 μm inclusive or thereabout.

Figure 15:
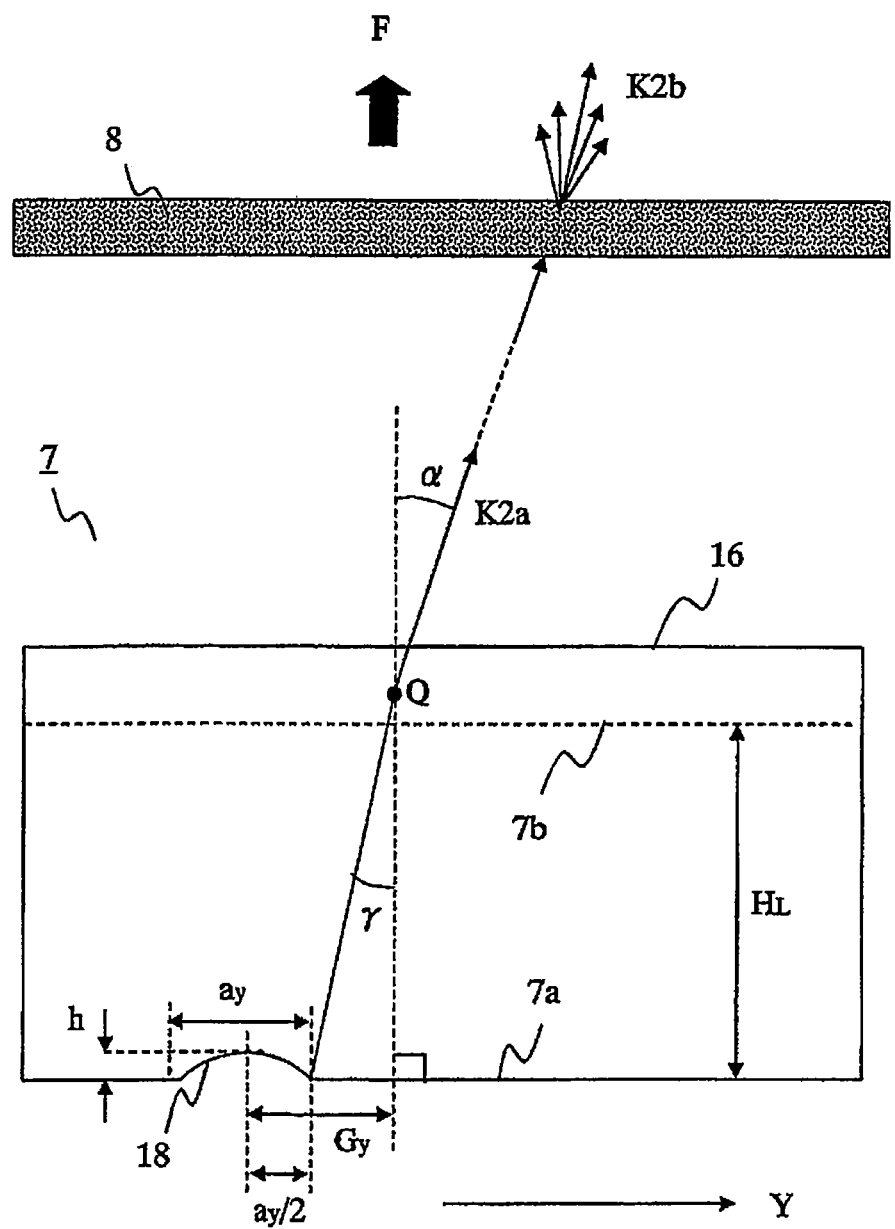
FIG. 15 is a cross sectional view of the light guide member and the isotropic light diffusion member when they are cut along a direction orthogonal to the light incident surface, and is a view illustrating how light output from a light deflection element rises up by the isotropic light diffusion member.

FIG. 15 illustrates a sectional view taken along a direction parallel to the extending directions of the unit lenses 16, and illustrates a path of a light beam in the light guide member 7 when light K2a is output from the point Q close to a corresponding end of a unit lens 16 while the light K2a is inclined by the angle α with respect to the normal direction of the output surface 7b.

A unit lens 16 has no concave and convex structure in the direction of the Y axis. For this reason, an angle γ formed between light output from a light deflection element 18 and the normal direction of a unit lens 16 can be calculated using the following formula (9); the formula (9) is based on Snell's law applied when light is output from a medium having a refractive index of $N_L$ into air having a refractive index of 1:

$$\gamma = \sin^{-1}\left(\frac{\sin\alpha}{N_L}\right). \tag{9}$$

The amount of spread $G_y$ of a light deflection element 18 in the Y direction when being viewed from the view side F with the isotropic light diffusion member 8 mounted on the light guide 7 is obtained in accordance with the following formula (9):

$$G_y = H_L \tan\gamma + \frac{a_y}{2}. \tag{10}$$

To more accurately calculate the amount of spread $G_y$, the distance between the point Q and the output surface 7b may be additionally considered. However, as described above, because each unit lens 16 has a minute thickness, the amount of spread $G_y$ is calculated when such a micro thickness of each unit lens 16 is ignored so that the height of the unit lenses 16 is approximated by $H_L$.

Next, a range of the arrangement pitches $L_x$ and that of the arrangement pitches $L_y$ while the isotropic light diffusion member 8 is mounted on the light guide member are obtained. The arrangement pitches $L_x$, which are within the corresponding obtained range, permit the light deflection elements 18 not to be visibly recognized. The arrangement pitches $L_y$, which are within the corresponding obtained range, permit the light deflection elements 18 not to be visibly recognized.

Figure 16A:
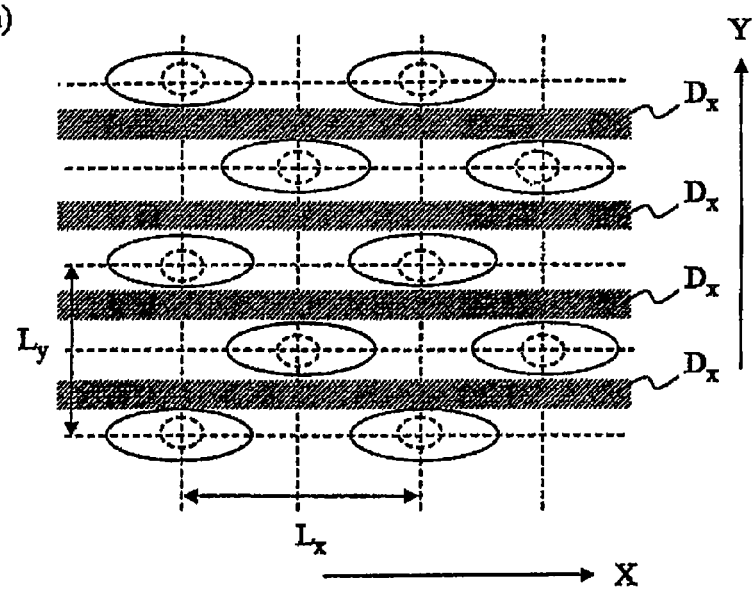
FIG. 16(a) is a view illustrating how images of the light deflection elements are seen when an illuminating device including the light guide member and the isotropic light diffusion member is viewed from the view side.
Figure 16B:
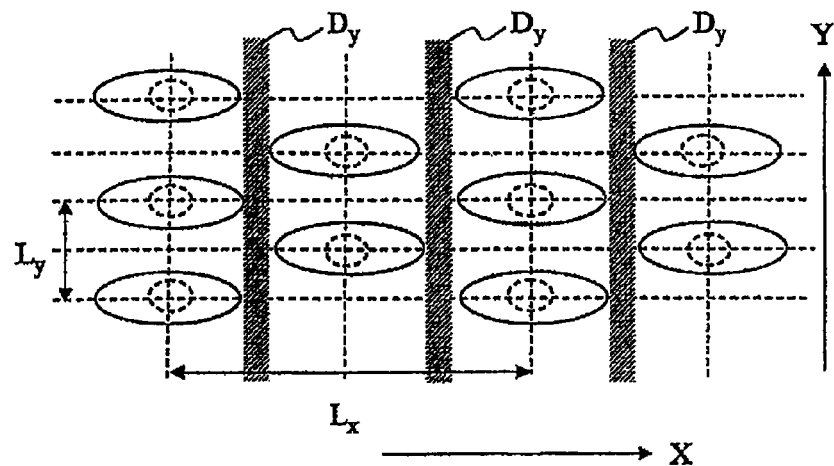
FIG. 16(b) is a view illustrating how images of light deflection elements are seen when the illuminating device including the light guide member and the isotropic light diffusion member is viewed from the view side.

Dashed lines illustrated in FIGS. 16(a) and 16(b) show the light deflection elements 18 arranged in the light guide member 7, and solid lines show images of the light deflection members 18 when being viewed from the view side F with the isotropic light diffusion member 8 mounted on the light guide 7.

For example, the light deflection elements 18 arranged as illustrated in FIG. 16(a) cause obliquely hatched regions $D_x$ on which no images of the light deflection elements 18 are superimposed to be generated in the direction of the X axis, and the regions are viewed as dark portions. In contrast, regions on which the light deflection elements 18 are arranged other than the obliquely hatched regions are viewed as light portions. Thus, light and dark fringes are visibly recognized. Such light and dark fringes may deteriorate the quality of the display.

The light deflection elements 18 arranged as illustrated in FIG. 16(b) cause obliquely hatched regions $D_y$ on which no images of the light deflection elements 18 are superimposed to be generated in the direction of the Y axis, and the regions are viewed as dark portions. In contrast, regions on which the light deflection elements 18 are arranged other than the obliquely hatched regions are viewed as light portions. Thus, light and dark fringes are visibly recognized. Such light and dark fringes may deteriorate the quality of the display.

The widths of the dark regions $D_x$ and $D_y$ become zero when $L_x=4G_x$ and $L_y=4G_y$ are satisfied. Thus, setting the arrangement pitches $L_x$ to be a value lower than the value $4G_x$ and setting the arrangement pitches $L_y$ to be a value lower than the value $4G_y$ reduces the development of the dark regions.

Setting the arrangement pitches $L_x$ to be a value lower than $2a_x$ and setting the arrangement pitches $L_y$ to be a value lower than the value $2a_y$ may cause some light deflection elements 18 to overlap with each other.

Thus, the range of the arrangement pitches $L_x$ and that of the arrangement pitches $L_y$ for preventing the light deflection elements 18 from visually recognized are defined by the following formulae (11):

$$2a_x \leq L_x \leq 4G_x$$

$$2a_y \leq L_y \leq 4G_y \quad (11).$$

The arrangement pitches $L_x$ and the arrangement pitches $L_y$ lying within the respective ranges illustrated in FIG. 11 make it possible to prevent the light deflection elements 18 from being visually recognized. However, even if the arrangement pitches $L_x$ and the arrangement pitches $L_y$ satisfy these conditions, there may be a problem in view of luminance uniformity of light output from the light guide member 7. A rate of light deflection elements 18 per unit area will be referred to as a light-deflection element density. A lower value of the light-deflection element density may cause the luminance close to a light incident surface 7L to extremely decrease. This may significantly deteriorate the display quality of the display. A lower value of the light-deflection element density may also cause light output from an LED not to be deflected upwards at the vicinity of a light incident surface 7L but to be guided into the light guide member 7. This may reduce luminance adjacent to the light incident surface 7L.

Two light deflection elements 18 are included in a rectangular area formed by the length $L_x$ in the direction of the X axis and the length $L_y$ in the direction of the Y axis. Assuming that an area of a light deflection element 18 when the light deflection element 18 is viewed from the light deflection surface 7a is set to $S_d$, the light-deflection element density D, i.e. the area rate, can be given by $2S_d/L_xL_y$.

For example, let us assume that a light deflection element 18 when the light deflection element 18 viewed from the light deflection surface 7a has an elliptical shape having a width $a_x$ in the direction of the X axis and a width $a_y$ in the direction of the Y axis. In this assumption, the light-deflection element density D can be calculated in accordance with the following formula (12) based on a formula representing the area of an ellipse:

$$\frac{\pi a_x a_y}{2 L_x L_y}. \quad (12)$$

In order to prevent extreme reduction of luminance adjacent to a light incident surface 7L, the light-deflection element density D is preferably set to be equal to or greater than 0.01. If the light-deflection element density D was set to be lower than 0.01, the rate of decrease of luminance adjacent to a light incident surface 7L would become 30% or higher when the light guide member 7 has 40-inch size and 3-mm width; the 40-inch size is represented by 500 mm×900 mm. The rate of decrease of luminance is defined to show the rate of decrease of luminance in the surface of the light guide member 7 with respect to the maximum luminance. The rate of decrease of luminance of 30% or higher would make possible that, when the illuminating device 3 is viewed, the difference in luminance between the adjacent portion of a light incident surface 7L and the center portion is clearly visibly recognized. This would result in a deterioration of the quality of the display 1. Thus, in order to prevent visible recognition of reduction in luminance adjacent to a light incident surface 7L of the light guide member 7, the light-deflection density D is preferably set to be equal to or higher than 0.01.

As a result, the arrangement pitches $L_x$ and the arrangement pitches $L_y$ preferably meet the following conditions, expressed by the following formulae (13), which are desired to prevent the light deflection elements 18 from being visually recognized and prevent reduction in luminance adjacent to a light incident surface 7L:

$$2a_x \leq L_x \leq 4G_x$$
$$2a_y \leq L_y \leq 4G_y \quad (13)$$
$$\frac{2S_d}{L_x L_y} \geq 0.01.$$

Figure 17:
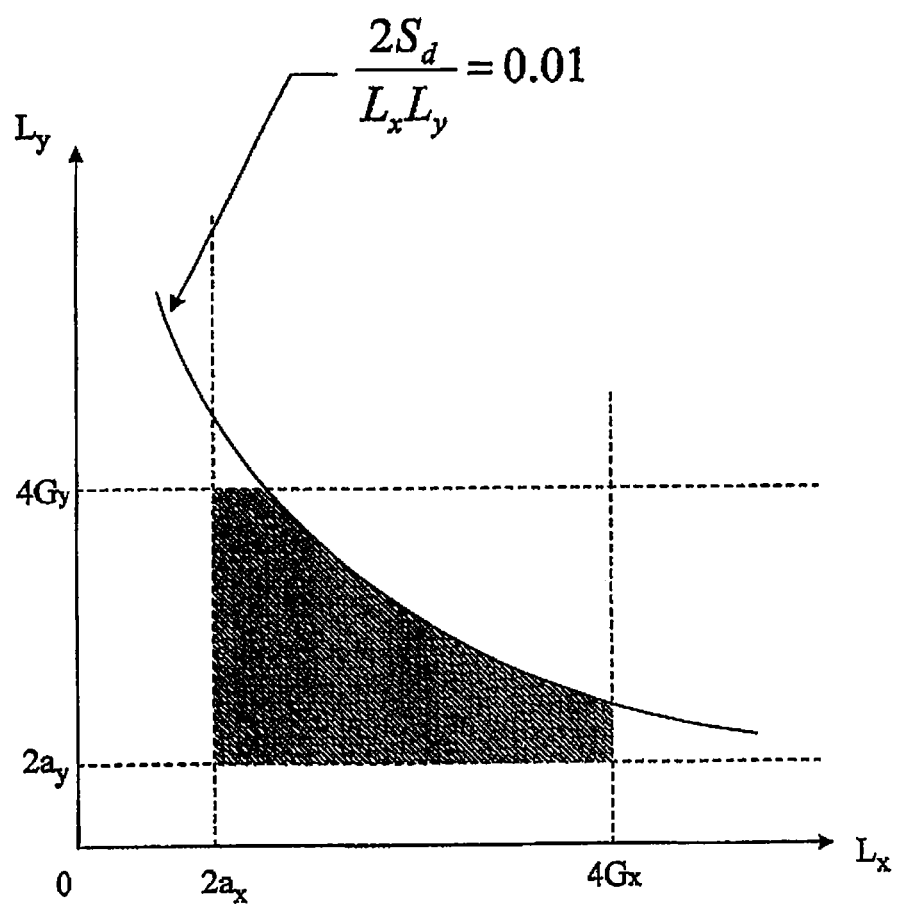
FIG. 17 is a graph illustrating a region in which no light deflection elements are visually recognized and uniform luminance is obtained when the horizontal axis represents pitches of the light deflection elements in an X direction and the vertical axis represents pitches of the light deflection elements in a Y direction.

These conditions are defined as an oblique hatched region in the coordinate system whose vertical axis shows $L_y$ and whose horizontal axis shows $L_x$ illustrated in FIG. 17.

The illuminating device according to an embodiment of the present invention, which satisfies the formula (13), makes it possible to prevent the light deflection elements 18 of the light guide member 7 constituting the illuminating device 3, and prevent visual recognition of reduction in luminance adjacent to a light incident surface 7L.

As described above, the light deflection elements 18 of the light guide member 7 according to an embodiment of the present invention are arranged such that, the farther from an incident surface 7L, the denser the light deflection elements 18 are. If the light guide plate has a pair of incident surfaces opposing each other, the light deflection elements 18 are arranged to increase the area that light deflection elements 18 occupy per unit area of the center portion of the light guide member far from both incident surfaces 7L.

Light deflection members 18 most densely contained in a region of the illuminating device according to an embodiment of the present invention are arranged to meet the following formula (14), resulting in reduction of manufacturing variations of the optical characteristics of the light guide members 7:

$$0.1 \leq \frac{2S_d}{L_x L_y} \leq 0.4. \tag{14}$$

Hereinafter, a region in which light deflection elements 18 are most densely arranged is set to a center region of the light guide member. In other words, the center portion of the light guide member is the farthest from incident surfaces on which paired light sources are respectively disposed. A portion of the light guide member having the highest value of the light-deflection element density D is the center portion of the light guide member.

When a designed height of the light deflection elements 18 is set to h, and the manufacturing variations of the height of the light deflection elements 18 are set to ±Δh, the height of the light deflection elements 18 including the manufacturing variations are given by h±Δh. If a manufactured light guide member 7 whose light deflection elements 18 have a height of h−Δh, the front surface of the center portion of the manufactured light guide member 7 has luminance higher than that of a manufactured light guide member 7 whose light deflection elements 18 have a height of h. On the other hand, if a manufactured light guide member 7 whose light deflection elements 18 have a height of h+Δh, the front surface of the center portion of the manufactured light guide member 7 has luminance lower than that of a manufactured light guide member 7 whose light deflection elements 18 have a height of h.

Figure 18A:
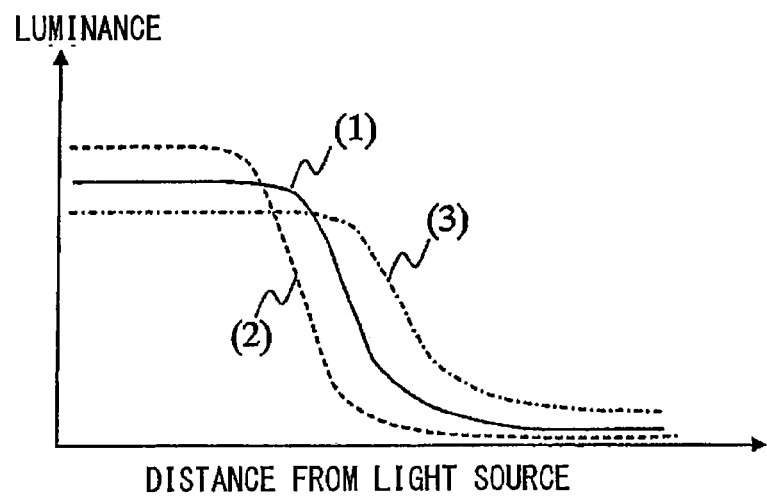
FIG. 18(a) is a graph illustrating a curve indicative of a luminance distribution in a direction orthogonal to an incident end surface when one of a pair of light sources is lit.
Figure 18B:
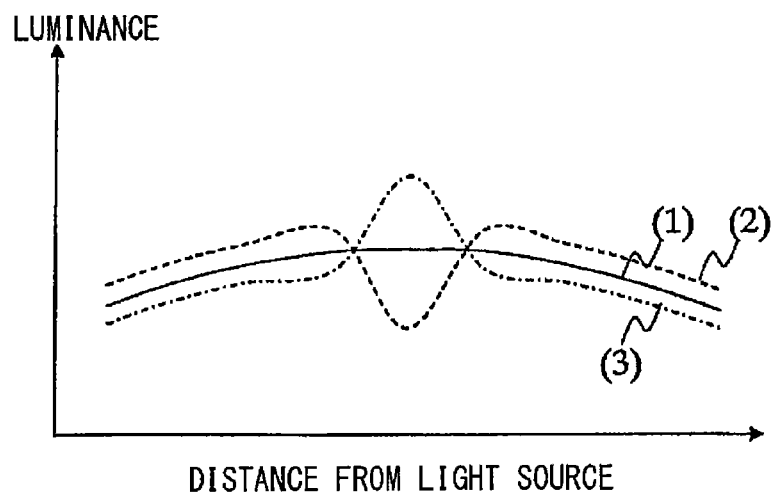
FIG. 18(b) is a graph illustrating a curve indicative of a luminance distribution in the direction orthogonal to the incident end surface when both of the paired light sources are lit.

FIG. 18(*a*) is a graph schematically illustrating luminance distributions in the direction orthogonal to the incident end surfaces 7L when one of a pair of light sources that are arranged to face the respective incident end surfaces is lit. A curve (1) represents one of the luminance distributions in a case where the light deflection elements 18 have the height h, and a curve (2) represents another one of the luminance distributions in a case where the light deflection elements 18 have the height h+Δh. In addition, a curve (3) represents the remaining luminance distribution in a case where the light deflection elements 18 have the height h−Δh.

An increase of the height of the light deflection elements 18 from the value h increases the probability of incident light into the light guide member being reflected by the light deflection elements 18. This results in:
- an increase of luminance in a region of the light guide member 7 close to the light source as compared with the case where the light deflection elements 18 have the height h; but
- a decrease of luminance in the center portion of the light guide member 7 as compared with the case where the light deflection elements 18 have the height h.

On the other hand, a decrease of the height of the light deflection elements 18 from the value h decreases the probability of incident light into the light guide member being reflected by the light deflection elements 18. This results in:
- a decrease of luminance in a region of the light guide member 7 close to the light source as compared with the case where the light deflection elements 18 have the height h; but
- an increase of luminance in the center portion of the light guide member 7 as compared with the case where the light deflection elements 18 have the height h.

FIG. 18(*b*) is a graph schematically illustrating luminance distributions in the direction orthogonal to the incident end surfaces 7L when both of the paired light sources arranged to face the respective incident end surfaces are illuminated. Reversal of each of the luminance distributions, illustrated in FIG. 18(*a*), obtained when one of the paired light sources is illuminated at the center of the light guide member 7 obtains reversed luminance distributions. Then, the sum of each of the luminance distributions, illustrated in FIG. 18(*a*), and the corresponding reversed luminance distributions obtains a corresponding one of the luminance distributions illustrated in FIG. 18(*b*).

If the luminance distribution obtained when the light deflection elements 18 have the height h has a gently curved convex shape (see (1) in FIG. 18(*b*)), the luminance distribution obtained when the light deflection elements 18 have the height h+Δh has a local trough at the center thereof (see (2) in FIG. 18(*b*)). In addition, the luminance distribution obtained when the light deflection elements 18 have the height h−Δh has a local crest at the center thereof (see (3) in FIG. 18(*b*)).

As described above, because variations in the height h cause variations in luminance at the center portion of the light guide member 7, it is desirable to reduce the variation range Δh to as low as possible. In an embodiment of the present invention, it has been found that reduction of the light-deflection element density D of light deflection elements 18 in the center portion of the light guide member 7 effectively reduces the variations in luminance due to the variations in height. The reason will be described with reference to FIG. 19.

FIG. 19(*a*) to FIG. 19(*c*) schematically illustrate graphs of luminance distributions in the direction orthogonal to the incident end surfaces 7L when one of the paired light sources arranged to face the respective incident end surfaces is lit. A solid line illustrated in FIG. 19(*a*) shows a luminance distribution obtained when: the light-deflection element density, i.e. the area ratio, of light deflection elements 18 included in the center portion of the light guide member 7 is D 1; and the light deflection elements 18 have the height h. A solid line illustrated in FIG. 19(*b*) shows a luminance distribution obtained when: the light-deflection element density, i.e. the rate of area, of light deflection elements 18 included in the center portion of the light guide member 7 is D2; and the light deflection elements 18 have the height h. A solid line illustrated in FIG. 19(*c*) shows a luminance distribution obtained when: the light-deflection element density, i.e. the rate of area, of light deflection elements 18 included in the center portion of the light guide member 7 is D3; and the light deflection elements 18 have the height h. The light-deflection element densities D1, D2, and D3 meet the following relation: D1<D2<D3.

An increase of the light-deflection element density in the center portion of the light guide member 7 increases the probability of light propagated in the light guide member 7 being reflected by the light deflection elements 18 included in the center portion of the light guide member 7. This reduces an amount of light passing through the center portion of the light guide member 7 to the opposing surface.

This results in the rate of change of the luminance distribution being rapidly changed at the front and back of the center portion of the light guide member 7 as illustrated in FIG. 19(*c*).

In contrast, a decrease of the light-deflection element density in the center portion of the light guide member 7 reduces the probability of light propagated in the light guide member 7 being reflected by the light deflection elements 18 included in the center portion of the light guide member 7. This increases an amount of light passing through the center portion of the light guide member 7 to the opposing surface.

This results in the rate of change of the luminance distribution being gently changed at the front and back of the center portion of the light guide member 7 as illustrated in FIG. 19(*a*).

Figure 19A:
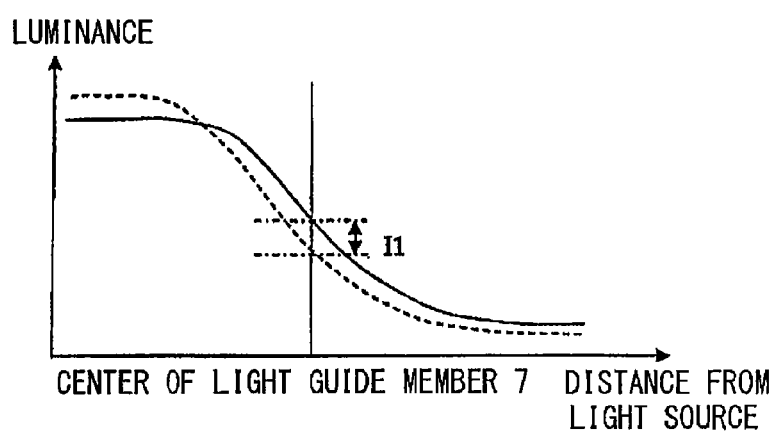
FIG. 19(a) is a graph illustrating solid and dashed curves each indicative of a luminance distribution in the direction orthogonal to the incident end surface when one of the paired light sources is lit when the light-deflection element density of a center portion of the light guide member is set to D1, a height thereof is set to h corresponding to the solid curve, and the height thereof is set to h+Δh corresponding to the dashed curve.
Figure 19B:
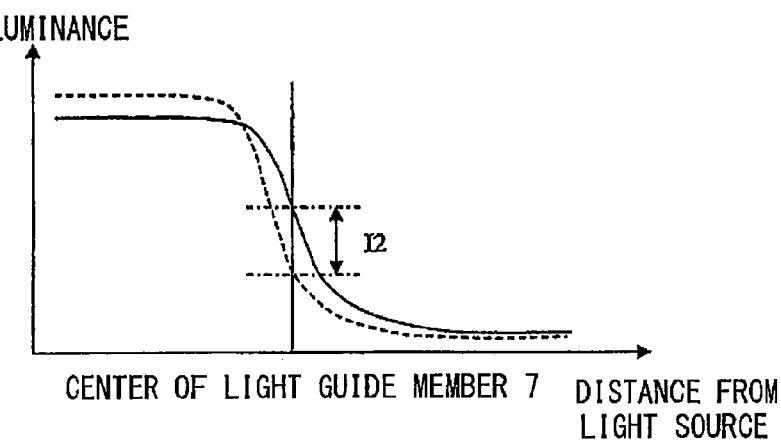
FIG. 19(b) is a graph illustrating solid and dashed curves each indicative of a luminance distribution in the direction orthogonal to the incident end surface when one of the paired light sources is lit when the light-deflection element density of a center portion of the light guide member is set to D2, the height thereof is set to h corresponding to the solid curve, and the height thereof is set to h+Δh corresponding to the dashed curve.
Figure 19C:
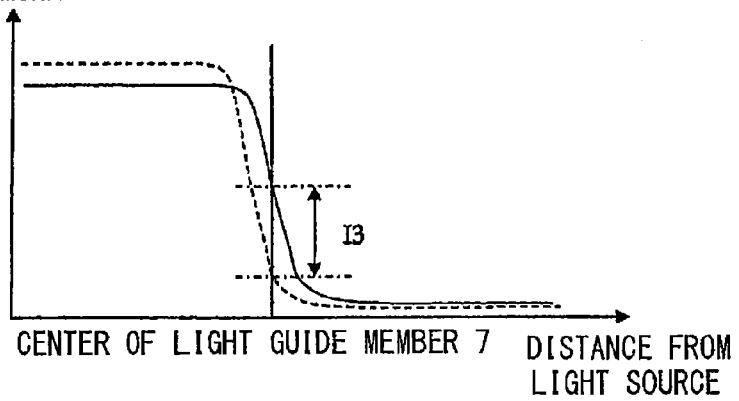
FIG. 19(c) is a graph illustrating solid and dashed curves each indicative of a luminance distribution in the direction orthogonal to the incident end surface when one of the paired light sources is lit when the light-deflection element density of a center portion of the light guide member is set to D3, the height thereof is set to h corresponding to the solid curve, and the height thereof is set to h+Δh corresponding to the dashed curve.

A dashed line illustrated in FIG. 19(a) shows a luminance distribution obtained when: the light-deflection element density, i.e. the rate of area, of light deflection elements 18 included in the center portion of the light guide member 7 is D1; and the light deflection elements 18 have the height h+Δh. A dashed line illustrated in FIG. 19(b) shows a luminance distribution obtained when: the light-deflection element density, i.e. the rate of area, of light deflection elements 18 included in the center portion of the light guide member 7 is D2; and the light deflection elements 18 have the height h+Δh. A dashed line illustrated in FIG. 19(c) shows a luminance distribution obtained when: the light-deflection element density, i.e. the rate of area, of light deflection elements 18 included in the center portion of the light guide member 7 is D3; and the light deflection elements 18 have the height h+Δh. The light-deflection element densities D1, D2, and D3 meet the following relation: D1<D2<D3.

An increase of the height of the light deflection elements 18 increases the probability of propagated light in the light guide member 7 being deflected upwards before reaching the center portion of the light guide member 7. This results in the light distribution obtained in a case of the height h of the light deflection elements 18 being shifted to the light-source side.

An amount of change of the center luminance resulted from change of the height of the light deflection elements 18 by Δh illustrated in FIG. 19(a) is represented as I1. An amount of change of the center luminance resulted from change of the height of the light deflection elements 18 by Δh illustrated in FIG. 19(b) is represented as I2. An amount of change of the center luminance resulted from change of the height of the light deflection elements 18 by Δh illustrated in FIG. 19(c) is represented as I3.

Each change quantity I1, I2, or I3 of the center luminance depends on the corresponding rate of change of a corresponding curve of the luminance distribution at the center portion of the light guide member 7. Thus, the change quantities I1, I2, and I3 meet the following relation: I1<I2<I3.

Thus, the light-deflection element density D of light deflection elements 18 included in the center portion of the light guide member 7 is preferably set to be no more than an upper limit in order to reduce variations in luminance due to variations in height of the light deflection elements 18. Particularly, it is desirable that the light-deflection element density D of light deflection elements 18 included in the center portion of the light guide member 7 is set to be no more than 0.4.

However, an excessive reduction of the light-deflection element density D causes loss of light due to escape of light from the other end surfaces opposite to the incident end surfaces 7L, resulting in reduction of luminance. Therefore, a lower limit of the light-deflection element density D is preferably set. It is desirable that the lower limit of the light-deflection element density D is set to be 0.1. A value of the light-deflection element density D lower than the lower limit would reduce front luminance, resulting in reduction of the advantage in luminance as compared with conventional printed light guide plates.

Advantages of forming the unit lenses 16 of the light guide member 7 include an advantage of causing incident light into an incident surface 7L of the light guide member 7 to go straight to thereby generate no dark portions S set forth above. The advantages of forming the unit lenses 16 of the light guide member also include an advantage of collecting light output from the light guide member 7 by the unit lenses 16 to thereby increase luminance of the display. For example, let us consider the following case. In the case, the light guide member 7 has a rectangular shape when viewed in the view side F. In the case, light sources are disposed along respective two short sides of the light guide member 7, and the unit lenses 16 are formed along the longitudinal sides of the light guide member 7. In the case, the isotropic light diffusion member 8 is located on the side of the output surface 7b of the light guide member 7. In the case, the prism sheet 20 is arranged at the side of the light output surface such that an extending direction of the prisms 24 is directed along the longitudinal sides of the light guide member 7.

In the case, output light from the light guide member 7 having higher directivity, i.e. a large percentage of output light having a direction u3 illustrated in FIG. 13, may cause the light to be fully reflected by the surfaces of the prisms 24 of the prism sheet 20, so that the reflected light may be returned back to the light guide member 7. This may make it difficult to sufficiently increase luminance of the illuminating device 3.

To increase luminance of the illuminating device 3, the light output from the light guide member 7 preferably has an angular distribution having a desirable spread. However, if output light from the isotropic light diffusion sheet 8 was excessively spread in an oblique direction, it would be difficult for the prism sheet 20 to deflect light toward the view side F, resulting in reduction of luminance.

Assuming that an average inclination angle φ over one pitch of a unit lens 16 is defined as the following formula (15), the spread of output light from the light guide member 7 has a suitable distribution on condition that the average inclination angle φ over one pitch of a unit lens 16 is within the range from 15° to 35° inclusive.

$$\phi[\deg] = \frac{180}{\pi}\tan^{-1}\left[\frac{1}{P}\int_0^P\left|\frac{df(t)}{dt}\right|dt\right]. \quad (15)$$

If the average inclination angle φ was smaller than 15°, each unit lens 16 would have a weak refraction effect so that output light would be excessively spread. This would cause reduction of the collection ability of the prism sheet 20, resulting in reduction of luminance. This also would cause incident light into the light guide member 7 to be propagated while spreading in a fan-like form, resulting in the dark portions S being visibly recognized.

On the other hand, if the average inclination angle φ was greater than 35°, each unit lens 16 would refract light strongly so that light having higher directivity would be output in the direction u3. This would increase total reflection based on the prism sheet, resulting in reduction of luminance.

Each unit lens 16 is not limited to have particular shape. Each unit lens 16 can have a shape such that f(t) is a distance indicative of a part of a spherical function or a polynomial function including a quartic or higher-degree function, resulting in output light from the light guide member 7 while the output light has a proper spread. This can more efficiently increase luminance.

Figure 20:
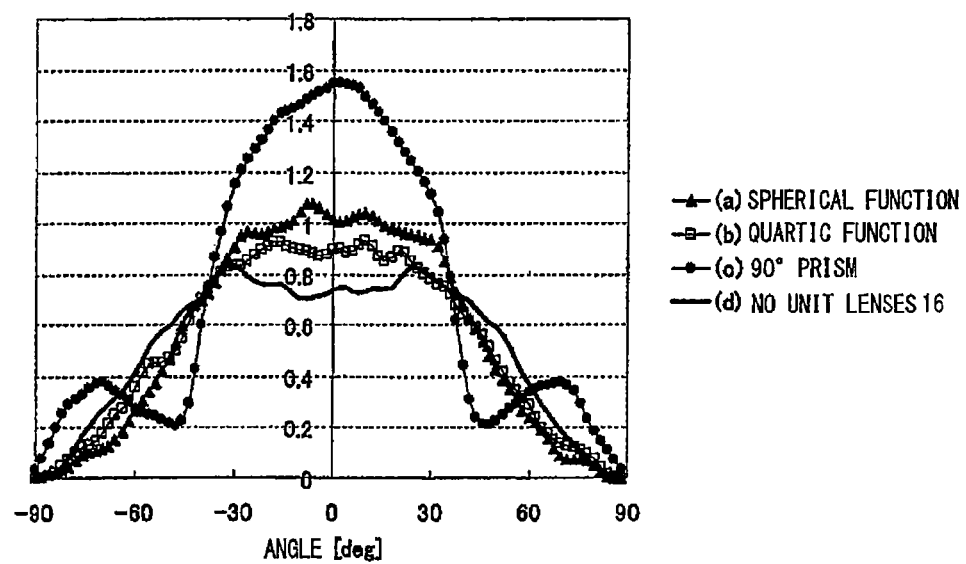
FIG. 20 is a graph illustrating an angular distribution of intensity of light output from the light guide member.

FIG. 20 shows:
an angular distribution, i.e. results of simulations, (a) of output light from the light guide member 7 formed by PMMA having a refractive index of 1.49 when f(t) is a spherical function with the inclination angle θ of 54° and the average inclination angle φ of 28°;
an angular distribution, i.e. results of simulations, (b) of output light from the light guide member 7 formed by PMMA having the refractive index of 1.49 when f(t) is a quartic function with the inclination angle θ of 51° and the average inclination angle φ of 20°;

an angular distribution, i.e. results of simulations, (c) of output light from the light guide member 7 formed by PMMA having the refractive index of 1.49 when each unit lens 16 is a 90-degree prism; and an angular distribution, i.e. results of simulations, (d) of output light from the light guide member 7 formed by PMMA having the refractive index of 1.49 when no unit lenses 16 are formed.

Note that multiplying, by $180/\pi$, the inclination angle $\theta$ that has been expressed by the formula (6) converts the inclination angle $\theta$ to an inclination angle $\theta$ in degree used in the angular distributions. Beam tracking software (LightTools) was used in the simulations.

Each of the angular distributions shows an angular distribution in a plane including the X axis and line u3 illustrated in FIG. 14. The horizontal axis of each of the angular distributions represents an angle formed with respect to the line u3. That is, an angular distribution having a sharp peak shows higher-intensity light in the u3 direction, and another angular distribution having a wide spread shows a large part of light inclined close to the X axis.

Let us consider the aforementioned light guide member 7 on which the isotropic light diffusion member 8 is mounted and the prism sheet 20 is mounted as a light collection sheet such that the extending direction of the prisms 24 is parallel to the unit lenses 16.

In this case, a 90-degree prism used as each lens unit 18 may have too strong light-collection ability of output light from the light guide member 7 so that total reflection generated when the prism sheet 20 is mounted on the light guide member 7 may reduce luminance.

No unit lenses 16 may cause the angular distribution to be too spread, so that prisms 24 of the sheet 10 cannot effectively cause light to be deflected upwards, making it difficult to increase luminance.

In contrast, the unit lenses 16 whose f(t) is a spherical function or a quartic function generate an angular distribution having a properly wider spread. This causes the prisms 24 of the prism sheet 20 to effectively deflect light upwards toward the view side F, resulting in an increase of luminance.

The light deflection elements 18 formed on the light deflection surface 7*a* of the light guide member 7 are preferably formed by not a printed pattern but a pattern consisting of concavities. If the light deflection elements 18 were formed by a printed pattern, incident light from the incident surfaces 7L would be scattered in all directions, making it difficult for the unit lenses 16 to efficiently collect light. For this reason, a large amount of light greatly inclined from the view side F would be output from the light guide member 7, so that prisms 24 of the sheet 10 could not effectively cause light to be deflected upwards, making it difficult to sufficiently increase luminance.

In contrast, concavities formed on the light deflection surface 7*a* as the light deflection elements 18 cause incident light from the incident surfaces 7L to be reflected totally by the surfaces of the light deflection elements 18, to that the totally reflected light having directivity goes toward the output surface 7*b*. This makes it possible for the unit lenses 16 to properly collect light.

Thus, the illuminating device 3 incorporating therein the light deflection elements 18 formed by concavities increases luminance more than that incorporating therein the light deflection elements 18 formed by a printed pattern.

Figure 21A:
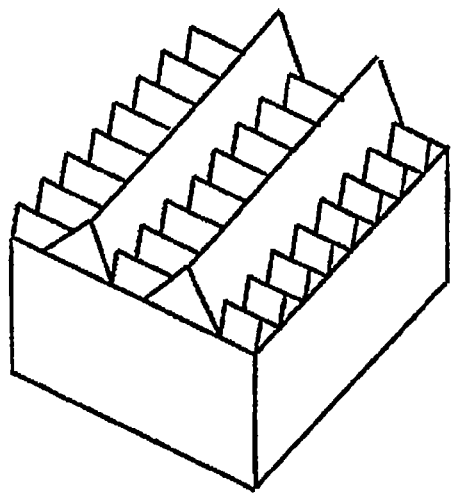
FIG. 21(a) is a view illustrating another example of a prism sheet.
Figure 21B:
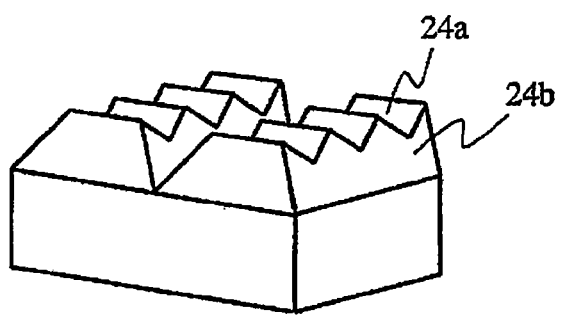
FIG. 21(b) is a view illustrating another example of a prism sheet.

The prism sheet 20 composed of the prisms 24 extending in one direction is used, but another prism sheet having crossed prisms (see FIG. 21(*a*)) can be used. As the prism sheet 20, a composite prism sheet comprised of trapezoidal prisms 24*a* and small prisms 24*b* formed on the tops of the respective trapezoidal prisms 24*a* can be used.

The light guide member 7 is integrally formed together with the light deflection elements 18 and the unit lenses 16 using extrusion, injection molding, or heat press, which can be suitably used in the technical field. As the light guide member 7, acrylate resin as typified by PMMA (Polymethylmethacrylate), or transparent resin, such as PET (Polyethylene Terephthalate), PC (Polycarbonate), COP (Cycloolefin Polymer), PAN (Polyacrylonitrile Copolymer), AS (Acrylonitrile-Styrene Polymer), or the like is used. After forming of a planer light guide member 7 using one of the methods, the light guide members 18 and the unit lenses 16 can be formed on the light guide member 7 using printing, UV curing resin, or radiation-curing resin.

It is desirable to integrally form the light guide member 7 according to an embodiment of the present invention together with the light deflection elements 18 and the unit lenses 16 using extrusion. This is because this method reduces the number of procedures for manufacturing the light guide member 7, and has mass productivity based on the fact that this method carries out a roll-to-roll process.

The light deflection elements 18 to be formed on the light guide member 7 according to an embodiment of the present invention has one-dimensional sparse and dense pattern. Thus, a roll die is disposed such that the width direction matches with the one-dimensional sparse and dense direction, and the light deflection elements 18 are arranged at regular intervals around the circumferential direction of the roll die. This makes it possible to integrally forming the light guide member 7 using a roll-to-roll process. Because the unit lenses 16 are formed on the light guide member 7 according to an embodiment of the present invention simultaneously, it is possible to achieve the light guide member 7 without including dark portions S even if the light deflection elements 18 has one-dimensional sparse and dense pattern. A roll die can be disposed such that the circumferential direction matches with the one-dimensional sparse and dense direction, and a die on which the light deflection elements 18 are located at regular intervals is arranged along the width direction of the roll die. This also can form the light guide member 7.

The isotropic light diffusion member 8 has a function of isotropically diffusing light output from the light guide member 7. A microlens sheet composed of a transparent base and a large number of semispherical microlenses are arrayed on a surface of the transparent base is for example used as the isotropic light diffusion member 8. Specifically, spherical particles are dispersed in a transparent resin, and respective parts of the spherical particles project from a surface of the transparent resin, so that a microlens sheet is produced; this microlens sheet can be used.

A device that passes or blocks light for each pixel to display an image can be preferably used as the image display device 2. Such a device that passes or blocks light for each pixel to display an image with an aid of the illuminating device 3 according to the embodiment results in:

improvement of luminance at the view side F;
reduction of dependency of light intensity on viewing angles; and
efficient use of light with reduced visibility of the light deflection elements 18 to display higher-quality images.

A liquid crystal display can be preferably used as the image display device 2. Liquid crystal displays are typical devices for passing or blocking light for each pixel, and they therefore can more improve qualities of images and reduce their manufacturing cost as compared with another type of display devices.

The embodiment according to the present invention based on the illuminating device 3 and the display 1 has been described, but the illuminating device 3 is not limited to be applied to the display 1. Specifically, the illuminating device 3, which has a function of efficiently collecting light transferred from the light source 6, can be used for lighting units.

EXAMPLES

Examples 1 to 7 and Comparative Examples 1 to 5

The following illuminating device 3 equipped with the light guide member 7 was manufactured.

The light guide member 7 has a rectangular parallelepiped shape with 40-inch size and 3-mm width; the 40-inch size is represented by 500 mm×900 mm. Two short sides, i.e. 500-mm sides, of the light guide member 7 serve as the light incident surfaces 7L. A row of the light sources 6 each consisting of an LED was arranged to face each of the light incident surfaces 7L.

Each of the light deflection elements 18 formed on the light deflection surface 7a of the light guide member 7 has a concave-microlens shape. The microlens shape has a height of 20 μm and an ellipsoidal bottom surface, so that it has a part of an ellipse. The bottom surface has a minor axis width of 100 μm and a major axis width of 200 μm.

The light deflection elements 18 were arranged such that, the farther away the light deflection elements 18 from the incident surfaces 7L, the higher the deflection-element density D is in the Y direction; the deflection-element density D shows the number of light deflection elements 18 existing per unit area. The arrangement pattern of the light deflection elements 18 was separated into ten regions in the Y direction. In each region, the arrangement pitches of light deflection elements in the X direction are constant. In each region, light deflection elements were arranged in the Y direction while adjacent light deflection elements were shifted from each other in the X direction by half of the arrangement pitches in the X direction. In each region, light deflection elements were arranged in the Y direction such that, the farther away from the incident surfaces 7L, the shorter the arrangement pitches in the Y direction were. The light deflection elements 18 were arranged such that their directions of the major axes were parallel to the X direction.

A large number of unit lenses 16 were arrayed on the output surface 7b of the light guide member 7 such that the unit lenses 16 extend in a direction parallel to the longitudinal sides of the light guide member 7. The pitch of each unit lens 16 was set to 150 μm.

The isotropic light diffusion member 8 was mounted on the output surface 7b of the light guide member 7, thus manufacturing the illuminating device 3. As the isotropic light diffusion member 8, an available microlens sheet composed of a transparent base and a large number of semispherical microlenses were arrayed on a surface of the transparent base was used. The microlens sheet has a diffusion angle α of 15° when collimated light is incident to the microlens sheet. Using extrusion of acrylate resin, which is PMMA having a refractive index of 1.49, the pattern of the light deflection elements 18 formed on a roll die and the pattern of the unit lenses formed on a roll die were transferred to a surface of the acrylate resin, so that the light guide member 7 was integrally manufactured.

Determination of whether the light deflection elements 18 and dark portions S were visibly recognized when viewed from view side F, and measurement of the rate of reduction of luminance adjacent to an incident surface 7L were performed using the following steps.

Determination of Visible Recognition of Light Deflection Elements 18

A view point was located at a position 50 cm toward the view side F from the outermost surface of the illuminating device 3. When the illuminating device 3 was viewed from the view point, whether images of the light deflection elements 18 were visibly recognized was determined. If no images of the light deflection elements 18 were visibly recognized, the result was represented by a circle character (O), or otherwise if images of the light deflection elements 18 were visibly recognized, the result was represented by a cross character (X).

Measurement of Rage of Reduction of Luminance

A spectral radiance meter, which is SR3 manufactured by TOPCON, was located at a position 50 cm toward the view side F from the outermost surface of the illuminating device 3, and luminance of the illuminating device 3 was measured.

Figure 22:
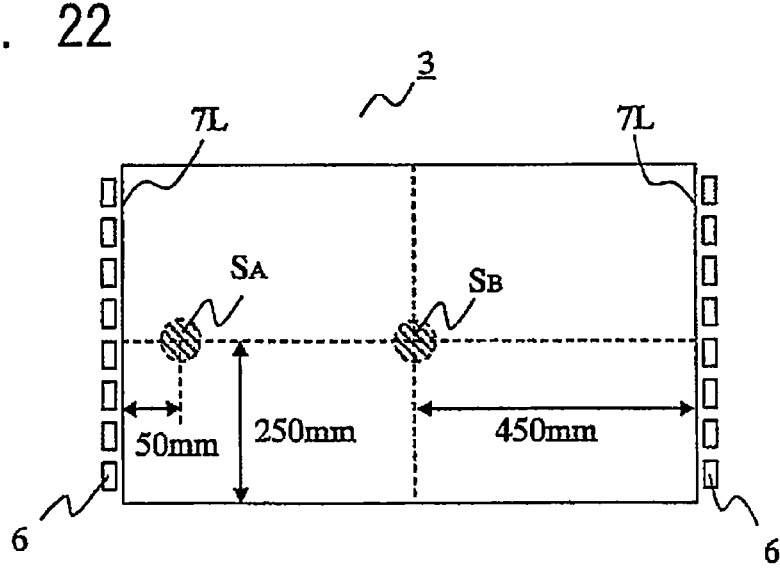
FIG. 22 is a view illustrating positions at which luminance was measured.

FIG. 22 is a plan view of the illuminating device 3. Luminance in an area SA far from an incident surface 7L of the light guide member 7 constituting the illuminating device 3 by 50 mm was measured as LA, and luminance in an area SB at the center portion of the illuminating device 3 was measured as LB. Then, the ratio LA/LB was calculated. Dashed lines crossing with each other at the center of the area SB illustrated in FIG. 21 illustrate phantom lines. One of the phantom lines is orthogonal to the longitudinal sides of the light guide member 7, and the other thereof is orthogonal to the short sides of the light guide member 7. If the ratio LA/LB is lower than 0.7, the result was represented by a cross character (X), and otherwise if the ratio LA/LB is equal to or higher than 0.7, the result was represented by a circle character (O).

Determination of Visible Recognition of Dark Portions S

A view point was located at a position far from the outermost surface of the illuminating device 3 by 100 cm toward the view side F. When the illuminating device 3 was viewed from the view point, whether dark portions S were visibly recognized was determined. If no dark portions S were visibly recognized, the result was represented by a circle character (O). If dark portions S were slightly visible, the result represents an allowable range of a product irrespective of visible recognition of light dark portions, so that the result was represented by a triangular character (Δ). Otherwise, if dark portions S were visibly recognized, the result was represented by a cross character (X).

Examples 1 to 3

The unit lenses 16 were formed on the output surface 7b of the light guide member 7 such that the extending directions of the unit lenses 16 were parallel to the longitudinal sides. The distance f(t) of a cross section of a unit lens 16 taken along a direction parallel to the short sides consists of a part of a spherical surface with the inclination angle θ of 54° and the average inclination angle φ of 28°. Note that, in the following examples and comparative examples, multiplying, by 180/π, the inclination angle θ that has been expressed by the formula (6) converts θ to a value θ in degrees.

The pitches $L_x$ and $L_y$, and the light-deflection element density D of light deflection elements 18 included in a region adjacent to corresponding light sources for each of the examples 1 to 3 were set as follows. Then, evaluation of visible recognition of the light deflection elements 18 and the dark portions S, and measurement of rate of reduction of luminance for each of the examples 1 to 3 were carried out. The results were described in table 1.

Example 1

$L_x$=1.0 mm;
$L_y$, was between or equal to 0.8 mm and 1.5 mm; and
Light-deflection element density D was between or equal to 0.021 and 0.039.

Example 2

$L_x$=2.0 mm;
$L_y$, was between or equal to 0.8 mm and 1.2 mm; and
Light-deflection element density D was between or equal to 0.013 and 0.020.

Example 3

$L_x$=2.5 mm;
$L_y$, was between or equal to 0.8 mm and 1.0 mm; and
Light-deflection element density D was between or equal to 0.013 and 0.016.

Examples 4 to 6

The unit lenses 16 were formed on the output surface 7b of the light guide member 7 such that the extending directions of the unit lenses 16 were parallel to the longitudinal sides. The shape f(t) of a cross section of a unit lens 16 taken along a direction parallel to the short sides consists of a quartic function with the inclination angle θ of 51° and the average inclination angle φ of 20°.

The pitches $L_x$ and $L_y$, and the light-deflection element density D of light deflection elements 18 included in a region adjacent to corresponding light sources for each of the examples 4 to 6 were set as follows. Then, evaluation of visible recognition of the light deflection elements 18 and the dark portions S, and measurement of rate of reduction of luminance for each of the examples 4 to 6 were carried out. The results were described in table 1.

Example 4

$L_x$=1.0 mm;
$L_y$, was between or equal to 0.8 mm and 1.5 mm; and
Light-deflection element density D was between or equal to 0.021 and 0.039.

Example 5

$L_x$=2.0 mm;
$L_y$, was between or equal to 0.8 mm and 1.2 mm; and
Light-deflection element density D was between or equal to 0.013 and 0.020.

Example 6

$L_x$=2.5 mm;
$L_y$, was between or equal to 0.8 mm and 1.0 mm; and
Light-deflection element density D was between or equal to 0.013 and 0.016.

Example 7

The unit lenses 16 were formed on the output surface 7b of the light guide member 7 such that the extending directions of the unit lenses 16 were parallel to the longitudinal sides. The shape f(t) of a cross section of a unit lens 16 taken along a direction parallel to the short sides consists of a quartic function with the inclination angle θ of 45° and the average inclination angle φ of 17°.

The pitches $L_x$ and $L_y$, and the light-deflection element density D of light deflection elements 18 included in a region adjacent to corresponding light sources for the example 7 were set as follows. Then, evaluation of visible recognition of the light deflection elements 18 and the dark portions S, and measurement of rate of reduction of luminance for the example 7 were carried out. The results were described in table 1.

Example 7

$L_x$=1.2 mm;
$L_y$, was between or equal to 0.8 mm and 1.0 mm; and
Light-deflection element density D was between or equal to 0.026 and 0.033.

Comparative Examples 1 to 4

The unit lenses 16 were formed on the output surface 7b of the light guide member 7 such that the extending directions of the unit lenses 16 were parallel to the longitudinal sides. The shape f(t) of a cross section of a unit lens 16 taken along a direction parallel to the short sides consists of a part of a spherical surface with the inclination angle θ of 54° and the average inclination angle φ of 28°.

The pitches $L_x$ and $L_y$, and the light-deflection element density D of light deflection elements 18 included in a region adjacent to corresponding light source for each of the comparative examples 1 to 4 were set as follows. Then, evaluation of visible recognition of the light deflection elements 18 and the dark portions S, and measurement of rate of reduction of luminance for each of the comparative examples 1 to 4 were carried out. The results were described in table 1.

Comparative Example 1

$L_x$=1.0 mm;
$L_y$ was between or equal to 0.8 mm and 2.5 mm; and
Light-deflection element density D was between or equal to 0.013 and 0.039.

Comparative Example 2

$L_x$=0.7 mm;
$L_y$ was between or equal to 0.8 mm and 4.0 mm; and
Light-deflection element density D was between or equal to 0.011 and 0.056.

Comparative Example 3

$L_x$=2.0 mm;
$L_y$ was between or equal to 0.8 mm and 2.0 mm; and
Light-deflection element density D was between or equal to 0.008 and 0.020.

Comparative Example 4

$L_x$=2.0 mm;
$L_y$ was between or equal to 0.8 mm and 2.5 mm; and
Light-deflection element density D was between or equal to 0.006 and 0.020.

Example 8

The unit lenses 16 were formed on the output surface 7b of the light guide member 7 such that the extending directions of the unit lenses 16 were parallel to the longitudinal sides. The shape f(t) of a cross section of a unit lens 16 taken along a direction parallel to the short sides consists of a quartic function with the inclination angle θ of 39° and the average inclination angle φ of 14°.

The pitches $L_x$ and $L_y$, and the light-deflection element density D of light deflection elements 18 included in a region adjacent to corresponding light sources for the example 8 were set as follows. Then, evaluation of visible recognition of the light deflection elements 18 and the dark portions S, and measurement of rate of reduction of luminance for the example 8 were carried out. The results were described in table 1.

Example 8

$L_x$=1.2 mm;
$L_y$ was between or equal to 0.8 mm and 1.0 mm; and
Light-deflection element density D was between or equal to 0.026 and 0.033.

Comparative Example 5

The light guide member according to the comparative example 5 was designed such that no unit lenses were formed on the light guide member of the example 8.

show excellent results, the visibility of the dark portions S shows a result inferior to the results of the respective first to seventh examples.

Examples 9 to 19

Next, the prism sheet 20 was mounted on the illuminating device 3, which is similar to the illuminating devices 3 manufactured by the respective examples 1 to 7, so that a new illuminating device 3 was manufactured.

The light guide member 7 has a rectangular parallelepiped shape with 40-inch size and 3-mm width; the 40-inch size is represented by 500 mm×900 mm. Two short sides, i.e. 500-mm sides, of the light guide member 7 serve as the light incident surfaces 7L. A row of the light sources 6 each consisting of an LED was arranged to face each of the light incident surfaces 7L.

Each of the light deflection elements 18 formed on the light deflection surface 7a of the light guide member 7 has a concave-microlens shape. The microlens shape has a height of 20 μm and an ellipsoidal bottom surface, so that it has a part of an ellipse. The bottom surface has the width of a minor axis of 100 μm and the width of a major axis of 200 μm.

The light deflection elements 18 were arranged such that, the farther away of the light deflection elements 18 from the incident surfaces 7L, the higher the deflection-element den-

TABLE 1

| | θ | φ | f(t) | Sd [mm2] | Gx [mm] | Gy [mm] | Lx [mm] | Ly [mm] | VISIBILITY OF LIGHT DEFLECTION ELEMENTS | RATE OF REDUCTION OF LUMINANCE | VISIBILITY OF DARK PORTIONS S |
|---|---|---|---|---|---|---|---|---|---|---|---|
| EXAMPLE 1 | 54 | 28 | SPHERICAL SURFACE | 0.016 | 1.76 | 0.58 | 1 | 1.5 | ○ | ○ | ○ |
| EXAMPLE 2 | 54 | 28 | SPHERICAL SURFACE | 0.016 | 1.76 | 0.58 | 2 | 1.2 | ○ | ○ | ○ |
| EXAMPLE 3 | 54 | 28 | SPHERICAL SURFACE | 0.016 | 1.76 | 0.58 | 2.5 | 1 | ○ | ○ | ○ |
| EXAMPLE 4 | 51 | 20 | QUARTIC FUNCTION | 0.016 | 1.68 | 0.58 | 1 | 1.5 | ○ | ○ | ○ |
| EXAMPLE 5 | 51 | 20 | QUARTIC FUNCTION | 0.016 | 1.68 | 0.58 | 2 | 1.2 | ○ | ○ | ○ |
| EXAMPLE 6 | 51 | 20 | QUARTIC FUNCTION | 0.016 | 1.68 | 0.58 | 2.5 | 1 | ○ | ○ | ○ |
| EXAMPLE 7 | 45 | 17 | QUARTIC FUNCTION | 0.016 | 1.52 | 0.58 | 1.2 | 1 | ○ | ○ | ○ |
| COMPARATIVE EXAMPLE 1 | 54 | 28 | SPHERICAL SURFACE | 0.016 | 1.76 | 0.58 | 1 | 2.5 | x | ○ | ○ |
| COMPARATIVE EXAMPLE 2 | 54 | 28 | SPHERICAL SURFACE | 0.016 | 1.76 | 0.58 | 0.7 | 4 | x | ○ | ○ |
| COMPARATIVE EXAMPLE 3 | 54 | 28 | SPHERICAL SURFACE | 0.016 | 1.76 | 0.58 | 2 | 2 | ○ | x | ○ |
| COMPARATIVE EXAMPLE 4 | 54 | 28 | SPHERICAL SURFACE | 0.016 | 1.76 | 0.58 | 2 | 2.5 | x | x | ○ |
| EXAMPLE 8 | 39 | 14 | QUARTIC FUNCTION | 0.016 | 1.38 | 0.58 | 1.2 | 1 | ○ | ○ | Δ |
| COMPARATIVE EXAMPLE 5 | — | — | SURFACE | 0.016 | 0.63 | 0.58 | 1.2 | 1 | ○ | ○ | x |

The results of the evaluations and measurements demonstrate that the visibility of the light deflection elements 18, the rate of reduction of luminance, and the visibility of the dark portions S of the illuminating device 3 incorporating therein the light guide member 7 of each of the examples 1 to 7 are all excellent. In contrast, in each of the comparative examples 1 to 5, any one of the visibility of the light deflection elements 18, the rate of reduction of luminance, and the visibility of the dark portions S shows a poor result marked by cross character (X). In the example 8, although the visibility of the light deflection elements 18 and the rate of reduction of luminance sity D is in the Y direction; the deflection-element density D shows the number of light deflection elements 18 existing per unit area. The arrangement pattern of the light deflection elements 18 was separated into ten regions in the Y direction. In each region, the arrangement pitches of light deflection elements in the X direction are constant. In each region, light deflection elements were arranged in the Y direction while light deflection elements were shifted in the X direction by half of the arrangement pitches in the X direction. In each region, light deflection elements were arranged in the Y direction such that, the farther away from the incident surfaces 7L, the shorter the arrangement pitches in the Y direction were. The light deflection elements 18 were arranged such that their directions of the major axes were parallel to the X direction.

The pitches $L_x$ and the pitches $L_y$ of light deflection elements 18 included in a region adjacent to corresponding light sources were respectively set to be 1.0 mm; and to be between or equal to 0.8 mm and 1.5 mm. The light-deflection element density D of light deflection elements included in a region adjacent to corresponding light sources were set to be between or equal to 0.021 and 0.039.

In addition, the light deflection elements 18 formed on the light deflection surface 7a were arranged such that the light-deflection element density D of light deflection elements included in a center portion of the light guide member 7 was set to one of values of the following examples 9 to 13. The shape f(t) of a cross section of a unit lens 16 taken along a direction parallel to the short sides consists of a part of a spherical surface with the inclination angle θ of 54° and the average inclination angle φ of 28°.

The pitch of each unit lens 16 was set to 150 μm. A reference light guide member 7 was prepared; the light guide member 7 was designed such that the light deflection elements 18 were formed but no unit lenses 16 were formed on the light guide member of the example 10.

Example 9

Light-deflection element density D was set to 0.1.

Example 10

Light-deflection element density D was set to 0.2.

Example 11

Light-deflection element density D was set to 0.3.

Example 12

Light-deflection element density D was set to 0.39.

Example 13

Light-deflection element density D was set to 0.05.

The light guide member 7 described in each of the respective examples 9 to 13 was installed in the new illuminating device 3. Thereafter, measurement of the center luminance LB for each of the examples 9 to 13 was carried out, and the measured results were described as luminance ratio in the following table 2; note that how to calculate the luminance ratio is to divide the center luminance LB for each of the examples 9 to 13 by the center luminance LB of the new illuminating device 3 incorporating therein the reference light guide member 7:

TABLE 2

| | LIGHT-DEFLECTION ELEMENT DENSITY D | LUMINANCE RATIO |
|---|---|---|
| EXAMPLE 9 | 0.1 | 101.8 |
| EXAMPLE 10 | 0.2 | 103.6 |
| EXAMPLE 11 | 0.3 | 104.2 |
| EXAMPLE 12 | 0.39 | 104.5 |
| EXAMPLE 13 | 0.05 | 100.3 |

Next, the height of the light deflection elements of the light guide member 7 was changed to manufacture a new illuminating device 3.

The light guide member 7 has a rectangular parallelepiped shape with 40-inch size and 3-mm width; the 40-inch size is represented by 500 mm×900 mm. Two short sides, i.e. 500-mm sides, of the light guide member 7 serve as the light incident surfaces 7L. A row of the light sources 6 each consisting of an LED was arranged to face each of the light incident surfaces 7L.

Each of the light deflection elements 18 formed on the light deflection surface 7a of the light guide member 7 has a concave-microlens shape. The microlens shape has a height of 21 μm and an ellipsoidal bottom surface, so that it has a part of an ellipse. The bottom surface has the width of a minor axis of 100 μm and the width of a major axis of 200 μm.

The light deflection elements 18 were arranged such that, the farther away of the light deflection elements 18 from the incident surfaces 7L, the more the deflection-element density D is in the Y direction; the deflection-element density D shows the number of light deflection elements 18 existing per unit area. The arrangement pattern of the light deflection elements 18 was separated into ten regions in the Y direction. In each region, the arrangement pitches of light deflection elements in the X direction are constant. In each region, light deflection elements were arranged in the Y direction while adjacent light deflection elements were shifted from each other in the X direction by half of the arrangement pitches in the X direction. In each region, light deflection elements were arranged in the Y direction such that, the farther away from the incident surfaces 7L, the shorter the arrangement pitches in the Y direction were. The light deflection elements 18 were arranged such that their directions of the major axes were parallel to the X direction.

The pitches $L_x$ and the pitches $L_y$ of light deflection elements, which are included in a region adjacent to corresponding light sources, in the light deflection elements 18 formed on light deflection surface 7a were respectively set to be 1.0 mm; and to be between or equal to 0.8 mm and 1.5 mm. The light-deflection element density D of light deflection elements 18 included in a region adjacent to corresponding light sources were set to be between or equal to 0.021 and 0.039.

In addition, the light deflection elements 18 formed on the light deflection surface 7a were arranged such that the light-deflection element density D of light deflection elements included in a center portion of the light guide member 7 was set to one of values of the following examples 14 to 19. The shape f(t) of a cross section of a unit lens 16 taken along a direction parallel to the short sides consists of a part of a spherical surface with the inclination angle θ of 54° and the average inclination angle φ of 28°.

The pitch of each unit lens 16 was set to 150 μm. A reference light guide member 7 was prepared; the light guide member 7 was designed such that the light deflection elements 18 were formed but no unit lenses 16 were formed on the light guide member of the example 10.

Example 14

Light-deflection element density D was set to 0.1.

Example 15

Light-deflection element density D was set to 0.2.

Example 16

Light-deflection element density D was set to 0.3.

Example 17

Light-deflection element density D was set to 0.39.

Example 18

Light-deflection element density D was set to 0.5.

Example 19

Light-deflection element density D was set to 0.6.

The light guide member 7 described in each of the respective examples 14 to 19 was installed in the new illuminating device 3. Thereafter, measurement of the center luminance for each of the examples 9 to 13 was carried out, and the measured results were described as luminance ratio in the following table 3. Like the examples 9 to 13, how to calculate the luminance ratio is to divide the center luminance for each of the examples 14 to 19 by the center luminance of the new illuminating device 3 incorporating therein the reference light guide member 7:

TABLE 3

|  | LIGHT-DEFLECTION ELEMENT DENSITY D | LUMINANCE RATIO |
|---|---|---|
| EXAMPLE 14 | 0.1 | 101.1 |
| EXAMPLE 15 | 0.2 | 102.2 |
| EXAMPLE 16 | 0.3 | 102.8 |
| EXAMPLE 17 | 0.39 | 101.6 |
| EXAMPLE 18 | 0.5 | 99.8 |
| EXAMPLE 19 | 0.6 | 97.5 |

The measured results demonstrate that the luminance ratio of each of the new illuminating devices 3 incorporating therein a corresponding one of the light guide members 7 according to the examples 9, 10, 11, 12, 14, 15, 16, and 17 is excellent result, which is equal to or higher than 101%. Thus, we achieved that the front luminance of each of the new illuminating devices 3 incorporating therein a corresponding one of the light guide members 7 according to the examples 9, 10, 11, 12, 14, 15, 16, and 17 significantly increased in comparison to the new illuminating device 3 incorporating therein the reference light guide member 7.

In contrast, an excessively lower value of the light-deflection element density D in the example 13 caused an escape of light from the end surface, which is opposite to each incident end surface 7L, and the escape of light caused loss. We therefore did not achieve a significant luminance-increase effect in comparison to the reference light guide member 7.

An excessively higher value of the light-deflection element density D in each of the examples 18 and 19 caused an increase of the height of the light deflection element 18 from 20 μm to 21 μm to significantly reduce the center luminance LB. We therefore did not achieve a significant luminance-increase effect in comparison to the reference light guide member 7.

The height variations Δh during the process of manufacturing the pattern of the light deflection elements 18 result from: cutting deviations caused when the pattern of light deflection elements 18 is cut on a roll die; and variations caused when the pattern of the roll die is formed on a resin. It is difficult to reduce the height variations to be equal to or lower than 1 μm.

We determined that maintaining the light-deflection element density D of light deflecting elements 18 in the center portion of the light guide member 7 to be equal to or lower than 0.04 brought reduction of luminance due to the variations of the pattern into an allowable range.

Examples 20 to 25 and Comparative Examples 6 and 7

Next, the prism sheet 20 was mounted on the illuminating device 3, which is similar to the illuminating devices 3 manufactured by the respective examples 1 to 7, so that a new illuminating device 3 was manufactured.

The light guide member 7 has a rectangular parallelepiped shape with 40-inch size and 3-mm width; the 40-inch size is represented by 500 mm×900 mm. Two short sides, i.e. 500-mm sides, of the light guide member 7 serve as the light incident surfaces 7L. A row of the light sources 6 each consisting of an LED was arranged to face each of the light incident surfaces 7L.

Each of the light deflection elements 18 formed on the light deflection surface 7a of the light guide member 7 has a concave-microlens shape. The microlens shape has a height of 20 μm and an ellipsoidal bottom surface, so that it has a part of an ellipse. The bottom surface has the width of a minor axis of 100 μm and the width of a major axis of 200 μm.

The light deflection elements 18 were arranged such that, the farther away of the light deflection elements 18 from the incident surfaces 7L, the more the deflection-element density D is in the Y direction; the deflection-element density D shows the number of light deflection elements 18 existing per unit area. The arrangement pattern of the light deflection elements 18 was separated into ten regions in the Y direction. In each region, the arrangement pitches of light deflection elements in the X direction are constant. In each region, light deflection elements were arranged in the Y direction while adjacent light deflection elements were shifted from each other in the X direction by half of the arrangement pitches in the X direction. In each region, light deflection elements were arranged in the Y direction such that, the farther away from the incident surfaces 7L, the shorter the arrangement pitches in the Y direction were. The light deflection elements 18 were arranged such that their directions of the major axes were parallel to the X direction.

The pitches $L_x$ and the pitches $L_y$ of light deflection elements, which are included in a region adjacent to corresponding light sources, in the light deflection elements 18 formed on light deflection surface 7a were respectively set to be 1.0 mm; and to be between or equal to 0.8 mm and 1.5 mm. The light-deflection element density D of light deflection elements included in a region adjacent to corresponding light sources were set to be between or equal to 0.021 and 0.039.

The prism sheet 20 was made of a large number of prisms 24, each having an apical angle of 90°, were arrayed. The prism sheet 20 was arranged such that the extending direction of the prisms 24 was parallel to the longitudinal sides of the light guide member 7.

A spectral radiance meter SR3 was located at a position far from the outermost surface of the illuminating device 3 by 50 cm toward the view side F, and the center luminance of a new illuminating device 3 was measured.

The light guide member 7 to be installed in the new illuminating device 3 was designed such that the unit lenses 16 whose parameters θ, φ, and f(t) were given by the following examples 20 to 25 were formed while the extending direction of the prisms are parallel to the longitudinal sides. A reference light guide member 7 was prepared; the light guide member 7 was designed such that the light deflection elements 18 were formed but no unit lenses 16 were formed on the light guide member of the example 10.

The arrangement pitches of the light deflection elements 18 to be used for each of the examples 20 to 25, the comparative examples 6 and 7, and the reference light guide member 7 were properly designed such that the ratio of the luminance LA included in the region SA of the new illuminating device 3 to the luminance LB included in the region SB thereof became 0.8.

Example 20

P (arrangement pitches)=150 μm;
θ=51°;
φ=20°; and
f(t) was a quartic function.

Example 21

P (arrangement pitches)=150 μm;
θ=60°;
φ=25°; and
f(t) was a quartic function.

Example 22

P (arrangement pitches)=150 μm;
θ=54°;
φ=28°; and
f(t) was a spherical function.

Example 23

P (arrangement pitches)=150 μm;
θ=58°;
φ=30°; and
f(t) was a spherical function.

Example 24

P (arrangement pitches)=100 μm;
θ=57°;
φ=37°; and
f(t) was a two-dimensional function.

Example 25

P (arrangement pitches)=100 μm; and
each unit lens 16 is shaped as a prism shape having an apical angle of 90°.

The light guide member 7 described in each of the examples 20 to 25 and comparative examples 6 and 7 was installed in the new illuminating device 3. Dividing the center luminance LB of the new illuminating device 3 including the light guide members 7 according to each of the examples 20 to 25 and comparative examples 6 and 7 by that of the new illuminating device 3 including the reference light guide member 7 achieved the luminance ratio represented in percentage (%) described in the table 4.

Next, the light deflection elements 18 configuring as a circular printed pattern having its diameter of 200 μm were formed. Thereafter, the unit lenses 16 each having a shape specified by each of the comparative examples 6 and 7 were formed on the output surface 7b.

Comparative Example 6

P (arrangement pitches)=150 μm
θ=60°;
φ=28°; and
f(t) is a quartic function.

Comparative Example 7

P (arrangement pitches)=150 μm
θ=54°;
φ=28°; and
f(t) is a spherical function.

The arrangement pitches of the printed pattern were properly designed so that the ratio of the luminance LA included in the region SA of the new illuminating device 3 to the luminance LB included in the region SB thereof became 0.8.

The light guide member 7 described in each of the comparative examples 6 and 7 was installed in the new illuminating device 3 that was used by each of the examples 20 to 25. Thereafter, measurement of the center luminance for each of the comparative examples 6 and 7 was carried out, and the measured results were described as luminance ratio in the following table 4. Like the examples 20 to 25, how to calculate the luminance ratio is to divide the center luminance for each of the comparative examples 6 and 7 by the center luminance of the new illuminating device 3 incorporating therein the reference light guide member 7:

TABLE 4

| | θ | φ | f(t) | LUMINANCE RATIO |
|---|---|---|---|---|
| EXAMPLE 20 | 51 | 20 | QUARTIC FUNCTION | 104.5 |
| EXAMPLE 21 | 60 | 25 | QUARTIC FUNCTION | 104.1 |
| EXAMPLE 22 | 54 | 28 | SPHERICAL SURFACE | 103.6 |
| EXAMPLE 23 | 58 | 30 | SPHERICAL SURFACE | 103.3 |
| EXAMPLE 24 | 57 | 37 | QUADRATIC FUNCTION | 100.9 |
| EXAMPLE 25 | — | — | 90° PRISM | 100.3 |
| COMPARATIVE EXAMPLE 6 | 60 | 25 | QUARTIC FUNCTION | 95.2 |
| COMPARATIVE EXAMPLE 7 | 54 | 28 | SPHERICAL SURFACE | 94.7 |

We determined that the luminance ratio of the illuminating device 3 incorporating therein the light guide member 7 according to each of the examples 20 to 23 was equal to or higher than 102%, and that the illuminating device 3 incorporating therein the light guide member 7 according to each of the examples 20 to 23 showed excellent luminance characteristics.

In each of the examples 24 and 25, the luminance ratio was lower than 101%. Considering measurement error of ±1%, an effect of luminance improvement was insufficient. In contrast, the luminance ratio obtained by each of the comparative examples 6 and 7 were drastically reduced in comparison to that obtained by the reference light guide member 7.

Examples 26 to 31

The following illuminating device 3 equipped with the light guide member 7 and light sources provided for one side of the light guide member 7 was manufactured.

The light guide member 7 has a rectangular parallelepiped shape with 13-inch size and 0.55-mm width; the 13-inch size is represented by 170 mm×300 mm. One longitudinal side, i.e. 300-mm side, of the light guide member 7 serves as the light incident surface 7L. A row of the light sources 6 each consisting of an LED was arranged to face the light incident surface 7L.

Each of the light deflection elements 18 formed on the light deflection surface 7a of the light guide member 7 has a concave-microlens shape. The microlens shape has a height of 10 µm and an ellipsoidal bottom surface, so that it has a part of an ellipse. The bottom surface has the width of a minor axis of 70 µm and the width of a major axis of 100 µm.

The light deflection elements 18 were arranged such that, the farther away of the light deflection elements 18 from the incident surfaces 7L, the more the deflection-element density D is in the Y direction; the deflection-element density D shows the number of light deflection elements 18 existing per unit area. The arrangement pattern of the light deflection elements 18 was separated into five regions in the Y direction. In each region, the arrangement pitches of light deflection elements in the X direction are constant. In each region, light deflection elements were arranged in the Y direction while adjacent light deflection elements were shifted from each other in the X direction by half of the arrangement pitches in the X direction. In each region, light deflection elements were arranged in the Y direction such that, the farther away from the incident surfaces 7L, the shorter the arrangement pitches in the Y direction were. The light deflection elements 18 were arranged such that their directions of the major axes were parallel to the X direction.

A large number of unit lenses 16 were arrayed on the output surface 7b of the light guide member 7 such that the unit lenses 16 extend in a direction parallel to the short sides of the light guide member 7. The pitch of each unit lens 16 was set to 50 µm.

The isotropic light diffusion member 8 was mounted on the output surface 7b of the light guide member 7, thus manufacturing the illuminating device 3. As the isotropic light diffusion member 8, an available microlens sheet composed of a transparent base and a large number of semispherical microlenses were arrayed on a surface of the transparent base was used. The microlens sheet has a diffusion angle α of 15° when collimated light is incident to the microlens sheet. Using extrusion of acrylate resin, which is PMMA having a refractive index of 1.49, the pattern of the light deflection elements 18 formed on a roll die and the pattern of the unit lenses formed on a roll die were transferred to a surface of the acrylate resin, so that the light guide member 7 was integrally manufactured.

Examples 26 to 28

The unit lenses 16 were formed on the output surface 7b of the light guide member 7 such that the extending directions of the unit lenses 16 were parallel to the short sides. The shape f(t) of a cross section of a unit lens 16 taken along a direction parallel to the longitudinal sides consists of a part of a spherical surface with the inclination angle θ of 54° and the average inclination angle φ of 28°. Note that, in the following examples and comparative examples, multiplying, by 180/π, the inclination angle θ that has been expressed by the formula (6) converts θ to a value θ in degrees.

The pitches $L_x$ and $L_y$, and the light-deflection element density D of light deflection elements 18 included in a region adjacent to corresponding light sources for each of the examples 26 to 28 were set as follows. Then, evaluation of visible recognition of the light deflection elements 18 and the dark portions S, and measurement of rate of reduction of luminance for each of the examples 26 to 28 were carried out. The results were described in table 5.

Example 26

$L_x$=0.5 mm;
$L_y$, was between or equal to 0.45 mm and 0.5 mm; and
Light-deflection element density D was between or equal to 0.044 and 0.049.

Example 27

$L_x$=0.7 mm;
$L_y$ was between or equal to 0.35 mm and 0.4 mm; and
Light-deflection element density D was between or equal to 0.039 and 0.045.

Example 28

$L_x$=0.9 mm;
$L_y$ was between or equal to 0.3 mm and 0.35 mm; and
Light-deflection element density D was between or equal to 0.035 and 0.041.

Examples 29 to 31

The unit lenses 16 were formed on the output surface 7b of the light guide member 7 such that the extending directions of the unit lenses 16 were parallel to the short sides. The shape f(t) of a cross section of a unit lens 16 taken along a direction parallel to the longitudinal sides consists of a quartic function with the inclination angle θ of 51° and the average inclination angle φ of 20°.

The pitches $L_x$ and $L_y$, and the light-deflection element density D of light deflection elements 18 included in a region adjacent to corresponding light sources for each of the examples 29 to 31 were set as follows. Then, evaluation of visible recognition of the light deflection elements 18 and the dark portions S, and measurement of rate of reduction of luminance for each of the examples 29 to 31 were carried out. The results were described in table 5.

Example 29

$L_x$=0.5 mm;
$L_y$ was between or equal to 0.45 mm and 0.5 mm; and
Light-deflection element density D was between or equal to 0.044 and 0.049.

Example 30

$L_x$=0.7 mm;
$L_y$ was between or equal to 0.35 mm and 0.4 mm; and
Light-deflection element density D was between or equal to 0.039 and 0.045.

Example 31

$L_x$=0.9 mm;
$L_y$, was between or equal to 0.30 mm and 0.35 mm; and
Light-deflection element density D was between or equal to 0.035 and 0.041.

| | θ | φ | f(t) | Sd [mm2] | Gx [mm] | Gy [mm] | Lx [mm] | Ly [mm] | VISIBILITY OF LIGHT DEFLECTION ELEMENTS | RATE OF REDUCTION OF LUMINANCE | VISIBILITY OF DARK PORTIONS S |
|---|---|---|---|---|---|---|---|---|---|---|---|
| EXAMPLE 26 | 54 | 28 | SPHERICAL SURFACE | 0.005 | 0.36 | 0.13 | 0.5 | 0.5 | ○ | ○ | ○ |
| EXAMPLE 27 | 54 | 28 | SPHERICAL SURFACE | 0.005 | 0.36 | 0.13 | 0.7 | 0.4 | ○ | ○ | ○ |
| EXAMPLE 28 | 54 | 28 | SPHERICAL SURFACE | 0.005 | 0.36 | 0.13 | 0.9 | 0.35 | ○ | ○ | ○ |
| EXAMPLE 29 | 51 | 20 | QUARTIC FUNCTION | 0.005 | 0.34 | 0.13 | 0.5 | 0.5 | ○ | ○ | ○ |
| EXAMPLE 30 | 51 | 20 | QUARTIC FUNCTION | 0.005 | 0.34 | 0.13 | 0.7 | 0.4 | ○ | ○ | ○ |
| EXAMPLE 31 | 51 | 20 | QUARTIC FUNCTION | 0.005 | 0.34 | 0.13 | 0.9 | 0.35 | ○ | ○ | ○ |
| COMPARATIVE EXAMPLE 8 | 54 | 28 | SPHERICAL SURFACE | 0.005 | 0.36 | 0.13 | 0.5 | 0.9 | x | ○ | ○ |
| COMPARATIVE EXAMPLE 9 | 54 | 28 | SPHERICAL SURFACE | 0.005 | 0.36 | 0.13 | 1.2 | 1 | x | x | ○ |
| COMPARATIVE EXAMPLE 10 | 51 | 20 | QUARTIC FUNCTION | 0.005 | 0.34 | 0.13 | 0.5 | 0.9 | x | ○ | ○ |
| COMPARATIVE EXAMPLE 11 | 51 | 20 | QUARTIC FUNCTION | 0.005 | 0.34 | 0.13 | 1.2 | 1 | x | x | ○ |

Comparative Examples 8 and 9

The unit lenses 16 were formed on the output surface 7b of the light guide member 7 such that the extending directions of the unit lenses 16 were parallel to the short sides. The shape f(t) of a cross section of a unit lens 16 taken along a direction parallel to the longitudinal sides consists of a part of a spherical surface with the inclination angle θ of 54° and the average inclination angle φ of 28°. Note that, in the following examples and comparative examples, multiplying, by 180/π, the inclination angle θ that has been expressed by the formula (6) converts θ to a value θ in degrees.

The pitches $L_x$ and $L_y$, and the light-deflection element density D of light deflection elements 18 included in a region adjacent to corresponding light source for each of the comparative examples 8 and 9 were set as follows. Then, evaluation of visible recognition of the light deflection elements 18 and the dark portions S, and measurement of rate of reduction of luminance for each of the comparative examples 8 and 9 were carried out. The results were described in table 5.

Comparative Example 8

$L_x$=0.5 mm;
$L_y$ was between or equal to 0.7 mm and 0.9 mm; and
Light-deflection element density D was between or equal to 0.024 and 0.031.

Comparative Example 9

$L_x$=1.2 mm;
$L_y$ was between or equal to 0.8 mm and 1.0 mm; and
Light-deflection element density D was between or equal to 0.009 and 0.011.

Comparative Examples 10 and 11

The unit lenses 16 were formed on the output surface 7b of the light guide member 7 such that the extending directions of the unit lenses 16 were parallel to the short sides. The shape f(t) of a cross section of a unit lens 16 taken along a direction parallel to the longitudinal sides consists of a quartic function with the inclination angle θ of 51° and the average inclination angle φ of 20°.

The pitches $L_x$ and $L_y$, and the light-deflection element density D of light deflection elements 18 included in a region adjacent to corresponding light sources for each of the comparative examples 10 and 11 were set as follows. Then, evaluation of visible recognition of the light deflection elements 18 and the dark portions S, and measurement of rate of reduction of luminance for each of the comparative examples 10 and 11 were carried out. The results were described in table 5.

Comparative Example 10

$L_x$=0.5 mm;
$L_y$ was between or equal to 0.7 mm and 0.9 mm; and
Light-deflection element density D was between or equal to 0.024 and 0.031.

Comparative Example 11

$L_x$=1.2 mm;
$L_y$ was between or equal to 0.8 mm and 1.0 mm; and
Light-deflection element density D was between or equal to 0.009 and 0.011.

The results of the evaluations and measurements demonstrate that the visibility of the light deflection elements 18, the rate of reduction of luminance, and the visibility of the dark portions S of the illuminating device 3 incorporating therein the light guide member 7 of each of the examples 26 to 31 are all excellent. In contrast, in each of the comparative examples 8 to 11, any one of the visibility of the light deflection elements 18, the rate of reduction of luminance, and the visibility of the dark portions S shows a bad result marked by cross character (X).

Recent large liquid crystal TV, flat display panels, and the like mainly use one of a direct illuminating device and an edge-light illuminating device. Such a direct illuminating device is equipped with, as light sources, multiple CCFL (Cold Cathode Fluorescent Lamps) or LEDs (Light Emitting Diodes) arranged regularly behind a panel. A diffuser, which has high light-scattering properties, is located between an image display device, such as a liquid crystal panel, and the light sources. This prevents the cold cathode fluorescent lamps or LEDs as the light sources from being visibly recognized.

Figure 23:
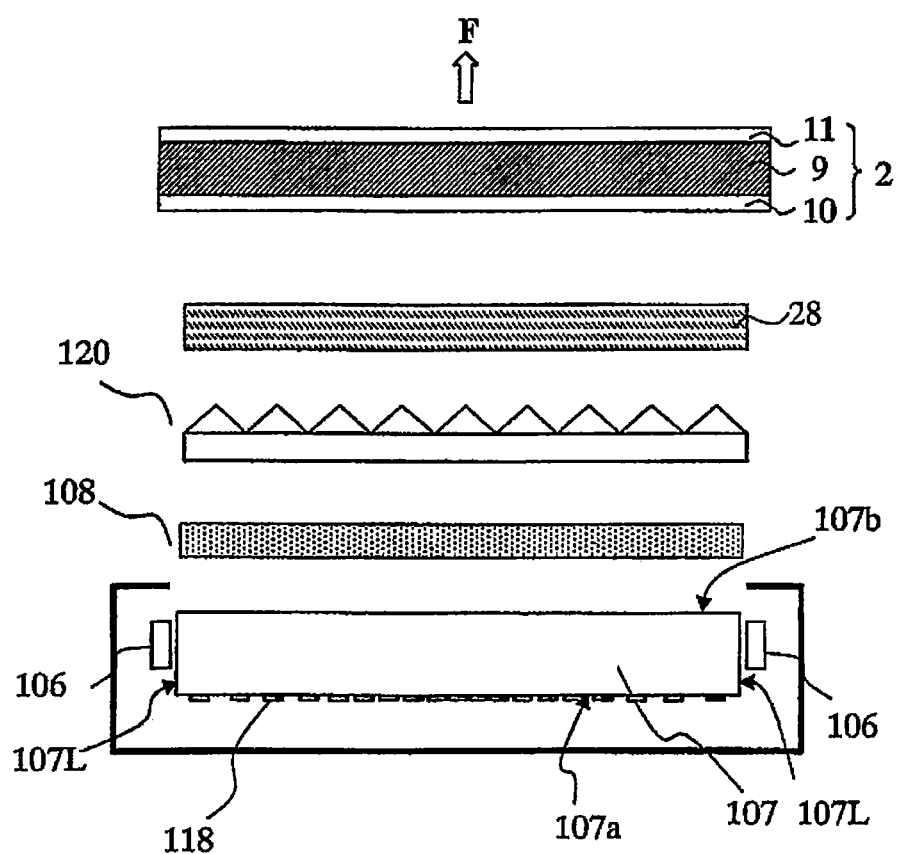
FIG. 23 is a view illustrating a conventional light guide member and a liquid crystal display including the conventional light guide member.

On the other hand, referring to FIG. 23, an edge-light illuminating device is equipped with multiple cold cathode fluorescent lamps or LEDs 106 arranged at edge surfaces of a light translucent plate, referred to as a light guide member 107. On one surface, referred to as a light deflection surface 107a, of the light guide member 107, which is opposite to an output surface 107b thereof, light deflection elements 118 are formed. The light deflection elements 118 efficiently guide light incident from the edge surfaces of the light guide member 107 to the output surface 107b. As light deflection elements 118 formed on the light deflection surface 107a, printed dots of white ink may be used (for example, see Japanese Patent Laid-Open No. H01-241590). However, because light incident into the white dots is reflected to be non-directionally diffused, the efficiency of directing light to the output surface side of the light guide member 107 is low. This results in loss of light due to light absorption by the white ink.

A method of forming microlenses on the light deflection surface 107a using inkjet, a method of forming the light deflection elements 118 using laser ablation, and the like may be employed. These methods use refraction, transmission, and reflection based on the difference in index of refraction between the resin of the light guide member 107 and light, which is different from a method using white ink, resulting in little light absorption. For this reason, it is possible to provide a light guide member 107 having a higher efficiency of directing light in comparison to white ink.

However, after the process of shaping the light guide member 107 in the form of a plate, an additional process of forming the light deflection elements 118 using inkjet or laser ablation is used as in the white-ink printing, resulting in difficulty reducing the number of manufacturing processes. The process of forming the light deflection elements 118 takes longer time than the white-ink printing process, and has a higher initial equipment cost.

Another method may be found in Japanese Patent Laid-Open No. 2000-89033. The method is to form the light guide member 107 using mold injection or extrusion molding, and directly shape the light deflection elements 118 during extrusion. This reduces the number of processes because of simultaneous formation of the light guide member 107 and the light deflection elements 118, resulting in lower cost.

Japanese Patent Laid-Open No. 2006-155994 describes a light guide member 107 having a prism groove extending in one direction as an example of patterning sparse and dense light deflection elements 118 in one dimensional direction. Such a light guide member 107 having one-directional sparse and dense patterning results in triangular low-luminance regions and/or dark regions S at the right and left side in the surface.

A light guide member 107 used in edge-light illuminating devices has a light deflection surface 107a located opposing an output surface 107b. On the light deflection surface 107a, light deflection elements 118, which have a white dot pattern, convex or concave microlenses, or another lens shape, are formed.

Such light deflection elements 118 are formed by regularly arranged reflection layers or structural elements. This may result in a problem of a moire interference pattern with respect to a prism sheet 20, as typified by, for example, BEF® as a registered trademark of the 3M company, and a problem of the image of the light deflection elements 118 being visibly recognized. In order to solve these problems, a diffusing film 108 described in Japanese Patent Laid-Open No. 2004-295080 may be located between the light guide member 107 and the prism sheet 120.

Japanese Patent Laid-Open No. 2003-270447 describes a light guide member 107 having formed the row of convex lenses extending an optical axis of a light source on an output surface 107b thereof. Each convex lens has an arc-shaped cross section parallel to a light incident surface 107L. The row of convex lenses formed on the light guide member 107 may provide a uniform luminance distribution of the light guide member 107, and prevent the light deflection elements 118 formed on the light deflection surface 107a of the light guide member 107 from being visibly recognized.

The light deflection elements 118 can be arranged in various layout patterns and various intervals. These various layout patterns include a square layout pattern, a rectangular layout pattern, a hexagonal layout pattern, and the like. The layout pattern and the intervals of the light deflection elements 118 can be changed according to the thickness, size, and material of the light guide member 107.

Some layout patterns or some intervals of the light deflection elements 118 may result in the image of the light deflection elements 118 being visibly recognized when the light guide member 107 is viewed from the side of the output surface 107b although the diffusing film 108 is mounted on the output surface 107b of the light guide member 107. That is, the capability of the image of the light deflection elements 118 being visibly recognized depends on various parameters including: the distance between the light deflection surface 107a and the output surface 107b; the refraction of the light guide member 107; the arrangement pitches of the light deflection elements 118; the shape of the row of convex lenses formed on the output surface 107b; the level of light diffusion of the diffusing film 108, and so on.

Let us consider adjustment of the pitches between the convex lenses and/or the radiuses of curvature of the convex lenses each having an arc-shaped cross section on the output surface 107b of each of various light guide members 107, which have different thicknesses, different sizes, and/or different materials. Due to the dependency of the various parameters, this approach may result in difficulty preventing uniform visible-recognition of the images of the light deflection elements 118 formed on the various light guide members 107.

As described in Japanese Patent Laid-Open No. 2003-270447, arranging a printed pattern of dots as the light deflection elements 118 may place restrictions on printable dot sizes. When the pattern of the light deflection elements 118 is printed on the light guide member 107 using screen printing, the size of the printed pattern is preferably set to be larger than 200 μm. If the size of the printed pattern was set to be equal to or smaller than 200 μm, clogging of a screen printing plate might take place, so that printing the light deflection elements 118 on some light guide members 118 might result in printing failure occurring in a large percentage of these light guide members 118. Setting the size of the printed pattern to be larger than 200 μm may cause the light deflection elements 118 to be visible, which may lead to provision of plural diffusing films 108 or a diffusing film 108 having higher light diffusion properties formed on the light guide member 107. However, increasing the number of diffusing lenses 108 or using a diffusing film 108 having higher light diffusion properties may cause light output from the light guide member 107 to be excessively scattered, resulting in reduction of luminance.

In addition, Japanese Patent Laid-Open No. 2003-270447 describes a light guide member 107 containing light diffusion particles, which may have disadvantage of increasing its manufacturing cost due to the inclusion of the light diffusion particles.

Japanese Patent Laid-Open No. 2004-6326 describes a light guide member 107 having an output surface 107b on which the row of convex lenses structured as lenticular lenses is formed. However, Japanese Patent Laid-Open No. 2004-6326 fails to describe how to arrange light deflection elements 118 formed on the light deflection surface. For this reason, arrangement of the convex lenses described in Japanese Patent Laid-Open No. 2004-6326 may result in difficulty preventing uniform visible-recognition of the images of the light deflection elements 118 having variable arrangement patterns formed on various light guide members 107 from being visibly recognized uniformly; the various light guide members 107 have different thicknesses, different sizes, and/or different materials.

One embodiment of the present invention provides edge-light illuminating devices, each of which is capable of reducing luminance variation, preventing light deflection elements from being visually recognized when being viewed, and having higher luminance. Displays each equipped with one of the illuminating devices are also provided.

An illuminating device according to an embodiment of the present invention includes a light source; a light guide member having an incident surface into which light output from the light source is incident, an output surface that outputs incident light to a view side, and a light deflection surface that guides the incident light to the output surface; and an isotropic light diffusion member arranged at a side of the output surface of the light guide member. The light guide member includes: multiple light deflection elements provided on the light deflection surface and formed to guide the incident light into the light guide member towards a side of the output surface, each of the light deflection elements having a concave portion or convex portion formed on the light deflection surface; and a unit lens formed on the output surface of the light guide member and extending in a direction orthogonal to the incident surface.

When a direction parallel to the incident surface is referred to as an X direction, and the direction orthogonal to the incident surface is referred to as a Y direction, a light-deflection element density D representing a number of the light deflection elements per unit increases as distances from the incident surface to positions at which the light deflection elements are located increase.

An arrangement pattern of the light deflection elements is divided into plural regions in the Y direction. Arrangement pitches of the light deflection elements in each region in the X direction are substantially constant. The light deflection elements are arranged in the Y direction while adjacent light deflection elements are shifted from each other in the X direction by half of the arrangement pitches in the X direction. The farther away from the incident surface, the shorter the arrangement pitches in the Y direction are.

When variables $G_x$, $G_y$, $\beta$, $\gamma$, and $\theta$ are defined by the set of the following formulae (1), values of variables $L_x$ and $L_y$ satisfy the set of the following formulae (2) in one of the plural regions, the one of the plural regions being adjacent to the incident surface:

$$G_x = H_L \tan(\theta - \beta) + \frac{a_x}{2} \quad (1)$$
$$G_y = H_L \tan\gamma + \frac{a_y}{2}$$
$$\beta = \sin^{-1}\left(\frac{\sin(\theta - \alpha)}{N_L}\right)$$
$$\gamma = \sin^{-1}\left(\frac{\sin\alpha}{N_L}\right)$$
$$\theta = \tan^{-1}\left[\frac{10}{P}\int_0^{1/10 P}\left|\frac{df(t)}{dt}\right|dt\right]$$

$$2a_x \leq L_x \leq 4G_x \quad (2)$$
$$2a_y \leq L_y \leq 4G_y$$
$$\frac{2S_d}{L_x L_y} \geq 0.01$$

where:
$L_x$ represents arrangement pitches of the light deflection elements in the X-axis direction;

$L_y$ represents arrangement pitches of the light deflection elements in the Y-axis direction;

$H_L$ represents a thickness of the light guide member;

$N_L$ represents a refractive index of the light guide member;

$S_d$ represents an area of one of the light deflection elements when viewed from a side of the light deflection surface;

t represents measured displacement in the X direction when an end of the unit lens is set to 0;

f(t) represents a distance between an edge of the unit lens and the output surface of the light guide member when the unit lens is taken along a plane orthogonal to the output surface and parallel to the X-axis direction;

P represents a pitch of the unit lens;

$\alpha$ represents an angle at which intensity of output light generated when collimate light is incident orthogonally to the isotropic light diffusion member becomes tenth part of a maximum intensity thereof in angular distribution of the output light;

$a_x$ represents a width of each of the light deflection elements in the X-axis direction; and $a_y$ represents a width of each of the light deflection elements in the Y-axis direction.

In the illuminating device according to an embodiment of the present invention, the light guide plate has a pair of incident surfaces into which the light output from the light source is incident. The incident surfaces of the pair are arranged to face each other. $L_x$ and $L_y$ in a region in which the light deflection elements are most densely arranged preferably satisfy the following formula (3):

$$0.1 \leq \frac{2S_d}{L_x L_y} \leq 0.4. \quad (3)$$

In the illuminating device according to an embodiment of the present invention, when an average angle $\phi$ [deg] over one pitch of the unit lens is a variable defined by the following formula (4), the average angle $\phi$ [deg] preferably is within a range defined by the following formula (5):

$$\phi[\deg] = \frac{180}{\pi}\tan^{-1}\left[\frac{1}{P}\int_0^P\left|\frac{df(t)}{dt}\right|dt\right] \quad (4)$$

$$15 \deg \leq \phi[\deg] \leq 35 \deg. \quad (5)$$

In the illuminating device according to an embodiment of the present invention, f(t) preferably includes a polynomial function including a term of a fourth power of t.

In the illuminating device according to an embodiment of the present invention, f(t) preferably includes a function including one of a pert of circular arc and a part of an elliptical arc.

The illuminating device according to an embodiment of the present invention preferably includes one or more light collection sheet.

The illuminating device according to an embodiment of the present invention preferably includes a reflective polarization separation sheet.

The illuminating device according to an embodiment of the present invention can be formed as a display including an image display device that defines an image to be displayed.

The illuminating device and the display using the illuminating device can prevent luminance variation and the light deflection elements formed in the light guide member from being visually recognized when the illuminating device and the display are viewed; and increase luminance of each of the light guide member, the illuminating device, and the display.

An embodiment of the present invention can provide illuminating devices having non-visible light deflection elements, high luminance with little luminance variation, and little manufacturing variations therebetween.

In one embodiment, an illuminating device includes a light source, a light guide member, and an isotropic light diffusion member. The light guide member has an incident surface into which light output from the light source is incident, an output surface that outputs incident light to a view side, and a light deflection surface that guides the incident light to the output surface. The light guide member includes light deflection elements provided on the light deflection surface and formed to guide the incident light into the light guide member to a side of the output surface. The light guide member includes multiple unit lenses formed on the output surface of the light guide member and extending in a direction orthogonal to the incident surface. Pitches of the light deflection members and light-deflection element density are arrayed within a predetermined range, and the unit lenses have a predetermined shape.

Obviously, numerous modifications and variations of the present invention are possible in light of the above teachings. It is therefore to be understood that within the scope of the appended claims, the invention may be practiced otherwise than as specifically described herein.

The invention claimed is:

1. An illuminating device, comprising:
a light source configured to output light;
a light guide member having an incident surface on which the light from the light source is incident, an output surface through which the light is output from the light guide member, and a light deflection surface on which a plurality of light deflection elements are formed such that the light is guided toward the output surface; and
an isotropic light diffusion member positioned over the output surface of the light guide member,
wherein the light guide member has the incident surface extended in an X direction and includes a unit lens formed on the output surface and extended in a Y direction orthogonal to the X direction,
the light deflection elements are positioned such that a light-deflection element density D representing a number of the light deflection elements per unit area increases as the light deflection elements are positioned farther away from the incident surface,
the light deflection elements are formed in a pattern which is divided into a plurality of regions in the Y direction and are positioned in one of the regions such that a pitch $L_x$ in the X direction is substantially constant, and that adjacent light deflection elements in the Y direction are shifted from each other in the X direction by a half of the pitch $L_x$ and have a pitch $L_y$ in the Y direction which becomes shorter as the light deflection elements are positioned farther away from the incident surface,
$G_x$, $G_y$, $\beta$, $\gamma$, and $\theta$ are defined by following formulae (1), and $L_x$ and $L_y$ satisfy following formulae (2) in one of the regions which is adjacent to the incident surface:

$$G_x = H_L \tan(\theta - \beta) + \frac{a_x}{2} \quad (1)$$
$$G_y = H_L \tan\gamma + \frac{a_y}{2}$$
$$\beta = \sin^{-1}\left(\frac{\sin(\theta - \alpha)}{N_L}\right)$$
$$\gamma = \sin^{-1}\left(\frac{\sin\alpha}{N_L}\right)$$
$$\theta = \tan^{-1}\left[\frac{10}{P}\int_0^{1/10P}\left|\frac{df(t)}{dt}\right|dt\right]$$

$$2a_x \leq L_x \leq 4G_x \quad (2)$$
$$2a_y \leq L_y \leq 4G_y$$
$$\frac{2S_d}{L_x L_y} \geq 0.01$$

where $H_L$ represents a thickness of the light guide member,
$N_L$ represents a refractive index of the light guide member,
$S_d$ represents an area of one of the light deflection elements when viewed from a side of the light deflection surface,
t represents a measured displacement in the X direction when an end of the unit lens is set to 0,
f(t) represents a distance between an edge of the unit lens and the output surface of the light guide member when the unit lens is taken along a plane orthogonal to the output surface and parallel to the X direction,
P represents a pitch of the unit lens,
$\alpha$ represents an angle at which an intensity of an output light generated by a collimate light incident orthogonally to the isotropic light diffusion member becomes one tenth of a maximum intensity thereof in an angular distribution of the output light,
$a_x$ represents a width of each of the light deflection elements in the X direction, and
$a_y$ represents a width of each of the light deflection elements in the Y direction.

2. The illuminating device according to claim 1, wherein each of the plurality of light deflection elements has a concave portion or a convex portion formed on the light deflection surface of the light guide member.

3. The illuminating device according to claim 1, wherein the incident surface is formed in a plurality and positioned to face each other, and
$L_x$ and $L_y$ in a region in which the light deflection elements are most densely positioned satisfy following formula (3):

$$0.1 \leq \frac{2S_d}{L_x L_y} \leq 0.4. \quad (3)$$

4. The illuminating device according to claim 1, wherein an average angle $\phi$ over one pitch of the unit lens is defined by following formula (4), and the average angle $\phi$ is within a range defined by following formula (5):

$$\phi[\deg] = \frac{180}{\pi}\tan^{-1}\left[\frac{1}{P}\int_0^P\left|\frac{df(t)}{dt}\right|dt\right] \quad (4)$$

$$15 \deg \leq \phi[\deg] \leq 35 \deg. \quad (5)$$

5. The illuminating device according to claim 1, wherein f(t) is a polynomial function including a term of a fourth power of t.

6. The illuminating device according to claim 1, wherein f(t) is a function including a portion of circular arc or a portion of an elliptical arc.

7. The illuminating device according to claim 1, further comprising:
at least one light collection sheet which is positioned over the isotropic light diffusion member and configured to collect light diffused by the isotropic light diffusion member.

8. The illuminating device according to claim 1, further comprising:
a reflective polarization separation sheet positioned over the isotropic light diffusion member.

9. The illuminating device according to claim 1, further comprising:
at least one light collection sheet positioned over the isotropic light diffusion member and configured to collect light diffused by the isotropic light diffusion member; and
a reflective polarization separation sheet positioned over the at least one light collection sheet.

10. The illuminating device according to claim 9, wherein the reflective polarization separation sheet, the light collection sheet, the isotropic light diffusion member, and the light guide member are sequentially positioned and form a laminate.

11. A display, comprising:
the illuminating device according to claim 1; and
an image display device that forms an image to be displayed.

12. The display according to claim 11, wherein each of the plurality of light deflection elements has a concave portion or a convex portion formed on the light deflection surface of the light guide member.

13. The display according to claim 11, wherein the incident surface of the illuminating device is formed in a plurality and positioned to face each other, and
$L_x$ and $L_y$ in a region in which the light deflection elements are most densely positioned satisfy following formula (3):

$$0.1 \leq \frac{2S_d}{L_x L_y} \leq 0.4. \quad (3)$$

14. The display according to claim 11, wherein an average angle $\phi$ over one pitch of the unit lens is defined by following formula (4), and the average angle $\phi$ is within a range defined by following formula (5):

$$\phi[\deg] = \frac{180}{\pi} \tan^{-1}\left[\frac{1}{P}\int_0^P \left|\frac{df(t)}{dt}\right| dt\right] \quad (4)$$

$$15 \deg \leq \phi[\deg] \leq 35 \deg. \quad (5)$$

15. The display according to claim 11, wherein f(t) is a polynomial function including a term of a fourth power of t.

16. The display according to claim 11, wherein f(t) is a function including a portion of circular arc or a portion of an elliptical arc.

17. The display according to claim 11, wherein the illuminating device further comprises at least one light collection sheet which is positioned over the isotropic light diffusion member and configured to collect a light diffused by the isotropic light diffusion member.

18. The display according to claim 11, wherein the illuminating device further comprises a reflective polarization separation sheet positioned over the isotropic light diffusion member.

19. The display according to claim 11, wherein the illuminating device further comprises at least one light collection sheet which is positioned over the isotropic light diffusion member and configured to collect a light diffused by the isotropic light diffusion member, and a reflective polarization separation sheet positioned over the at least one light collection sheet.

20. The display according to claim 19, wherein the reflective polarization separation sheet, the light collection sheet, the isotropic light diffusion member, and the light guide member are sequentially positioned and form a laminate.

* * * * *